(12) United States Patent
Sharman et al.

(10) Patent No.: US 8,588,554 B2
(45) Date of Patent: Nov. 19, 2013

(54) INTERPOLATION

(75) Inventors: Karl Sharman, Eastleigh (GB); Manish Devshi Pindoria, Stanmore (GB)

(73) Assignee: Sony Corporation, Tokyo (JP)

( * ) Notice: Subject to any disclaimer, the term of this patent is extended or adjusted under 35 U.S.C. 154(b) by 40 days.

(21) Appl. No.: 13/344,981

(22) Filed: Jan. 6, 2012

(65) Prior Publication Data

US 2012/0182441 A1 Jul. 19, 2012

(30) Foreign Application Priority Data

Jan. 17, 2011 (GB) .................................. 1100729.1

(51) Int. Cl.
*G06K 9/32* (2006.01)
*G06K 9/40* (2006.01)
*G09G 5/00* (2006.01)
*H04N 1/46* (2006.01)

(52) U.S. Cl.
USPC ............ 382/300; 382/260; 345/606; 358/525

(58) Field of Classification Search
USPC .......... 382/260, 296, 300, 305, 312; 345/606, 345/611; 358/525
See application file for complete search history.

(56) References Cited

U.S. PATENT DOCUMENTS 5,206,919 A * 4/1993 Keating ...................... 382/296
5,835,096 A * 11/1998 Baldwin ...................... 345/582
6,005,582 A * 12/1999 Gabriel et al. ............... 345/586

FOREIGN PATENT DOCUMENTS

WO       WO 00/75865 A1   12/2000

OTHER PUBLICATIONS

U.S. Appl. No. 13/345,126, filed Jan. 6, 2012, Sharman, et al.
United Kingdom Search Report issued on May 18, 2011 in corresponding United Kingdom Application No. GB1100729.1 filed on Jan. 17, 2011.

* cited by examiner

*Primary Examiner* — Kanjibhai Patel
(74) *Attorney, Agent, or Firm* — Oblon, Spivak, McClelland, Maier & Neustadt, L.L.P.

(57) ABSTRACT

A method of pixel interpolation in which a two-dimensional digital filter is arranged so as to interpolate an output pixel from a two-dimensional array of input pixels comprises detecting the direction of an image feature at a pixel position to be interpolated; applying a shear transformation to the digital filter and/or to the array of input pixels so as to map the operation of the filter to the detected image feature direction in respect of at least a first one of two axes of the two dimensional filter; and applying the digital filter to obtain the output pixels.

18 Claims, 24 Drawing Sheets

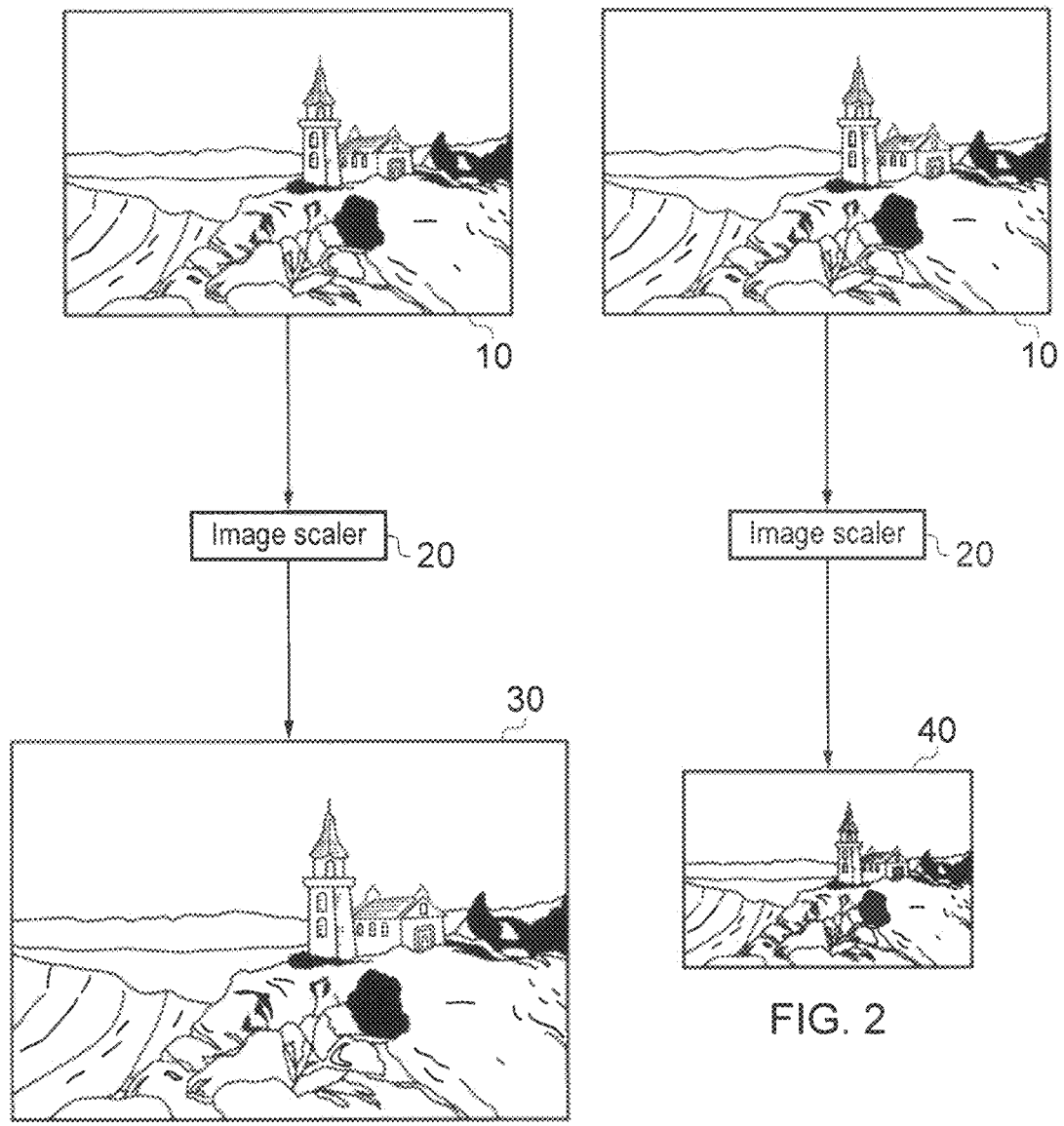

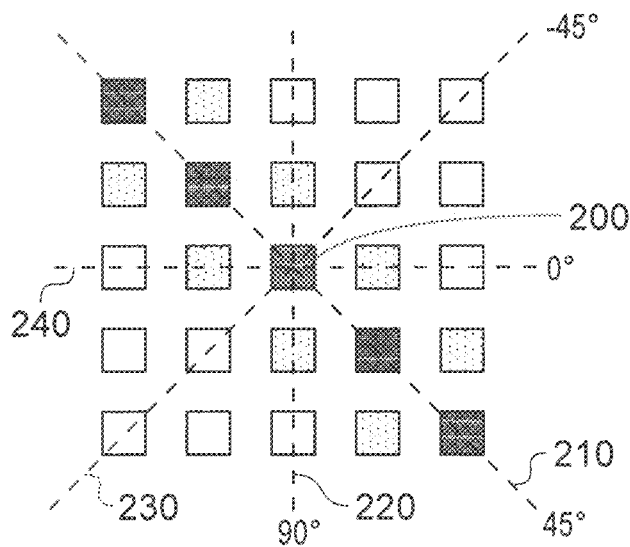
FIG. 4a
FIG. 4b
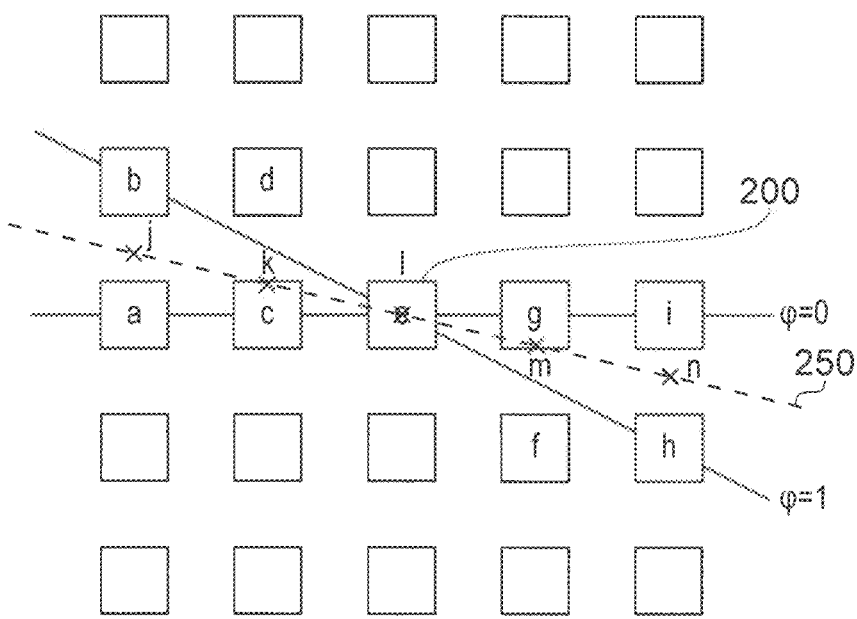
FIG. 5

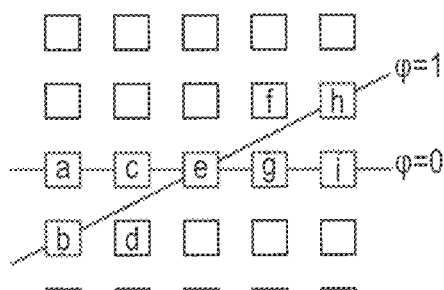
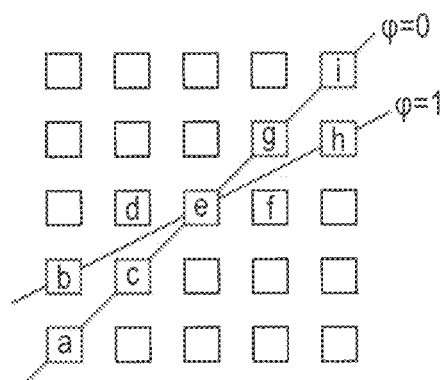
FIG. 6a            FIG. 6b
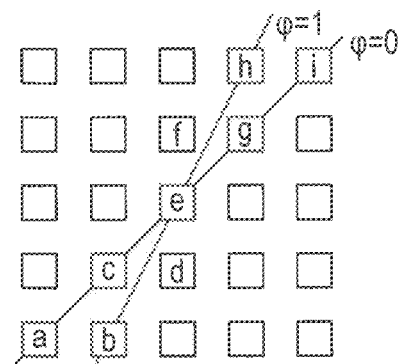
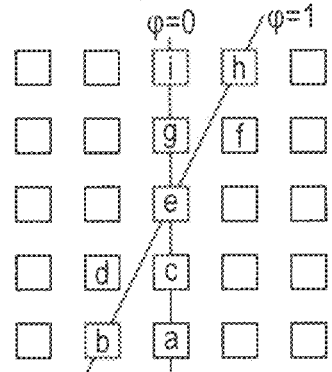
FIG. 6c            FIG. 6d
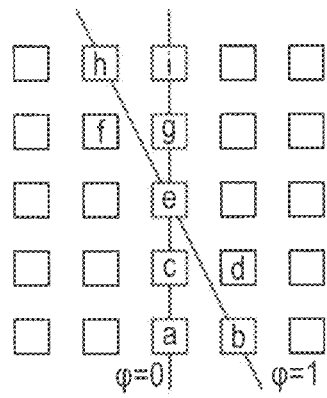
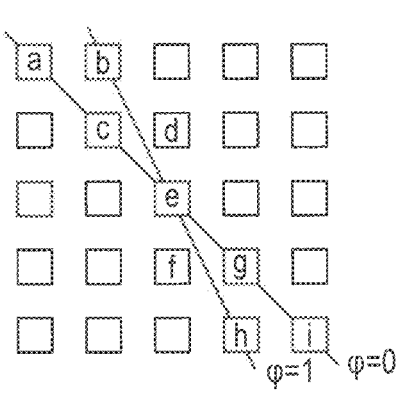
FIG. 6e            FIG. 6f
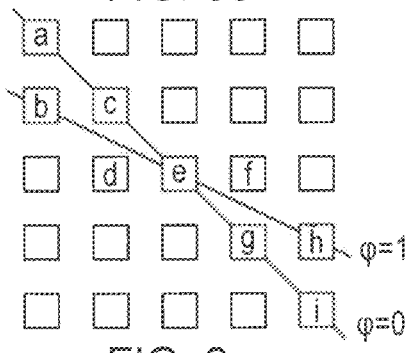
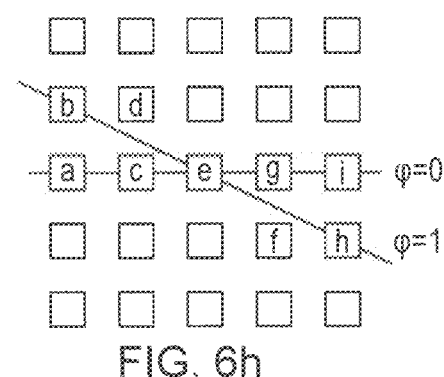
FIG. 6g            FIG. 6h

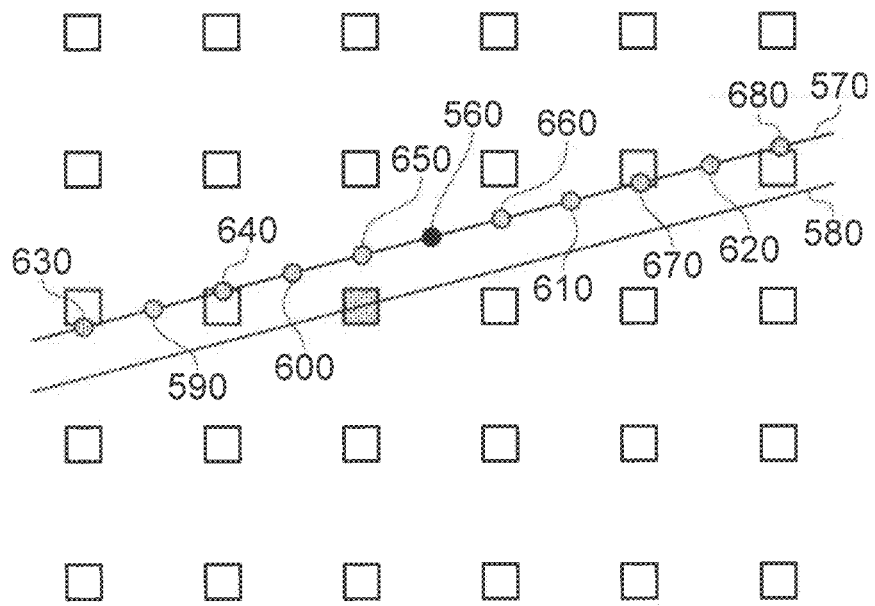
FIG. 14
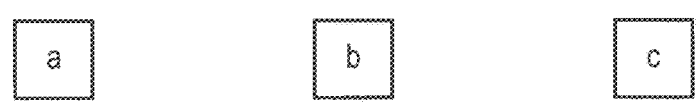
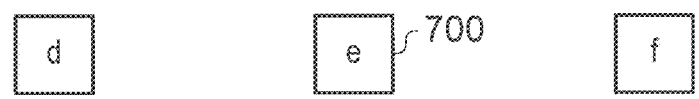
FIG. 15

| 45.0° | 45.0° | 45.0° | 45.0° | 40.0° |
|---|---|---|---|---|
| 45.0° | 45.0° | 45.0° | 45.0° | 40.0° |
| 45.0° | 45.0° | 45.0° | 45.0° | 40.0° |
| 45.0° | 45.0° | 45.0° | 45.0° | 40.0° |
| 40.0° | 40.0° | 40.0° | 40.0° | 50.0° |

FIG. 30

| 45.0° | 43.8° | 42.5° | 41.3° | 40.0° |
|---|---|---|---|---|
| 43.8° | 43.5° | 43.1° | 42.9° | 42.5° |
| 42.5° | 43.2° | 43.8° | 44.4° | 45.0° |
| 41.3° | 42.9° | 44.4° | 46.0° | 47.5° |
| 40.0° | 42.5° | 45.0° | 47.5° | 50.0° |

FIG. 31

INTERPOLATION

BACKGROUND OF THE INVENTION

1. Field of the Invention

This invention relates to interpolation.

2. Description of the Prior Art

Interpolation arrangements are used, for example, to generate output pixels from input pixels in an image or video processing arrangement.

Image processing is generally at least a two-dimensional operation. A basic technique involves convolving together a one-dimensional (1D) filter to scale horizontally with a corresponding filter to scale vertically, to produce a filter that is able to filter and scale an image in both directions with a single 2D filter matrix. The two dimensional filter resulting from the convolution of the two orthogonal filters is aligned to the horizontal and vertical axes.

It has been proposed that interpolation filtering should be arranged to align with the detected direction or angle of image features.

One technique of angle directed filtering is to rotate such a two dimensional filter matrix, so that the principal axis of the filter is aligned to a detected edge or image feature. The theory behind this principle is to align most of the energy of the filter along the length of the image feature. An additional stage is to increase the bandwidth of the filter in the direction perpendicular to the orientation of the edge in order to preserve the sharpness of the edge. The aim of the bandwidth increase is again to further increase the energy of the filter along the image feature line.

Although such a 2D edge directed filter method can produce some good results, there is a fundamental difficulty with the technique. The effect of the rotation is that the bandwidth has been changed in both directions unintentionally and, as a result, the output pixel is not as expected. The problems for this method increase further for non zero offset values (output pixel positions not aligned with input or source pixels); the edge directed rotation filter can produce significant striping artefacts when used for images with angled features.

It is an object of the invention to provide improved techniques for pixel interpolation.

SUMMARY OF THE INVENTION

This invention provides a machine-implemented method of pixel interpolation in which a two-dimensional digital filter is arranged so as to interpolate an output pixel from a two-dimensional array of input pixels, the method comprising:

detecting the direction of an image feature at a pixel position to be interpolated;

applying a shear transformation to the digital filter and/or to the array of input pixels so as to map the operation of the filter to the detected image feature direction in respect of at least a first one of two axes of the two dimensional filter; and applying the digital filter to obtain the output pixels.

Therefore, rather then use rotation, embodiments of the present invention provide another method to shape the filter by shearing the filter and/or the input data.

Shearing of the filter operation (i.e. shearing the filter and/or the input data) can align the energy of the filter along the edge or image feature direction; this allows for better bandwidth control for the filters when aligning to an edge and in embodiments of the invention it does not lead to as many artefacts as those introduced with the rotation method.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIGS. 1 and 2 schematically illustrate an image scaling process;

FIGS. 4a and 4b schematically illustrate a variance minimisation process;

FIG. 5 schematically illustrates a direction calculating template;

FIGS. 6a to 6h schematically illustrate templates for angle detection;

FIG. 14 schematically illustrates a point estimation process;

FIG. 15 schematically illustrates a corner consistency check;

FIGS. 30 and 31 schematically illustrate an angle averaging process;

DESCRIPTION OF THE EMBODIMENTS

Figure 3:
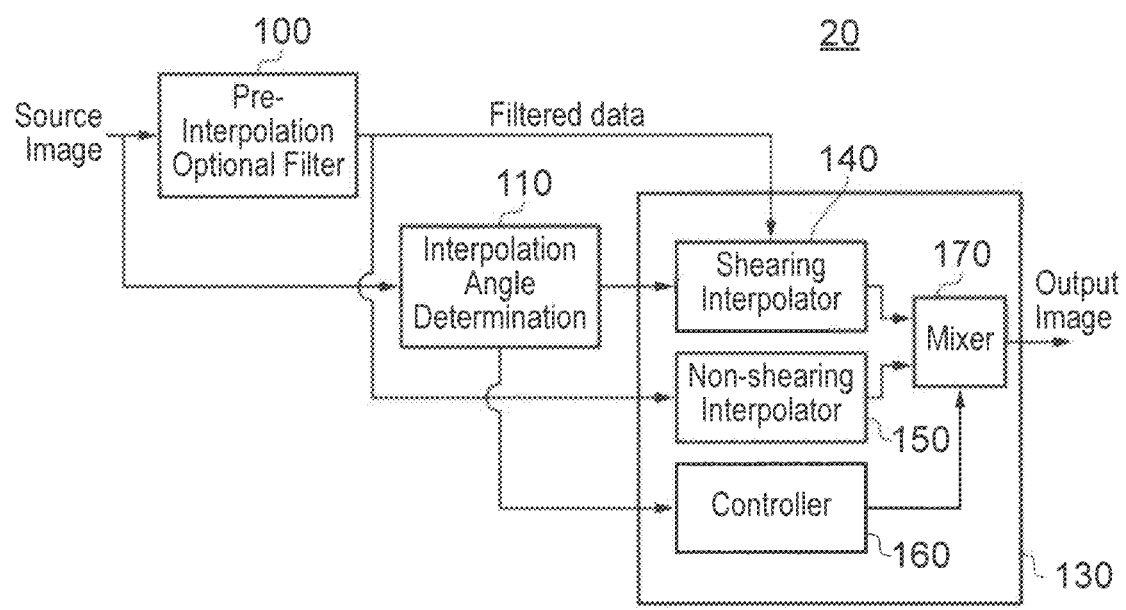
FIG. 3 is a schematic block diagram of an image scaling apparatus.

Referring now to the drawings, FIGS. 1 and 2 schematically illustrate an image scaling process, as applied to a source image 10. In each case the source image (a two-dimensional array of input pixels) 10 is processed by an image scaling apparatus 20, to generate a larger output image 30 (FIG. 1) or a smaller output image 40 (FIG. 2) formed of output pixels. Here, the terms "larger" and "smaller" refer to the number of pixels in the respective output images, rather than to a format in which the images are actually displayed. So, for example, if the input image has 1920 (horizontal)×1080 (vertical) pixels, the larger output image 30 might have 2880×1620 pixels, and the smaller output image 40 might have 960×540 pixels. Clearly, these pixel numbers are just examples, and in general the image scaler 20 can operate to scale the image across a range of scale factors which may include scale factors greater than one (for image enlargement) and/or scale factors less than one (for image size reduction). In the present description, for the purposes of the present examples the scale factors will be expressed as linear scale factors and will be considered to be the same in both the horizontal and the vertical axes (horizontal and vertical being orthogonal directions and relating to a horizontal and a vertical image direction respectively; in general, in embodiments of the invention the two axes to be discussed are orthogonal). However, in other embodiments the scale factors could be different for the two axes.

The image scaling arrangements described here use two-dimensional digital interpolation filtering techniques in which a two-dimensional digital filter is arranged so as to interpolate an output pixel from a two-dimensional array of input pixels, thereby to generate pixels of the scaled output image, so that each output pixel is based on a mathematical combination of a group of two or more input pixels. The filtering techniques are carried out by a computer or image processing apparatus. Such filtering techniques are appropriate because (a) when the input image is to be enlarged, new pixel values need to be generated at pixel positions which did not exist in the input image; (b) the same can be true if the image is to be reduced in size, because depending on the scale factor the output pixel positions may not align exactly with input pixel positions; and (c) even if the output pixel positions in a scale-reduced output image do align with input pixel positions, a more aesthetically pleasing result can be obtained by using a filtering process rather than simply discarding unwanted input pixels.

Video scaling is a significant application of image scaling techniques. At a simple level, each image of the succession of images forming a video signal can be scaled (larger or smaller) by an image scaling apparatus 20, so as to form a scaled video signal. Video scaling is often used for conversion between different video standards (such as between so-called standard definition (SD) video and so-called high definition (HD) video), for video special effects, for forensic analysis of video such as in the analysis of surveillance video signals or video signals relating to astronomy observations, or for other purposes. The apparatus of FIGS. 1 and 2 may be considered as video scaling apparatus when arranged to operate on one or more of the successive images of a video signal. The skilled person will appreciate that video scaling apparatus, method, software, computer program product and the like are all considered to be embodiments of the present invention and to be included within the scope of the present description. In particular, when a technique is described here are relating to the processing of an image, it will be appreciated that the technique may be applied to the scaling of each successive image of a video signal.

In the present description, many of the techniques are applicable to either image scaling or video scaling. Where a technique is described that is applicable to only one of these technical fields, or is more suitable for use in one of the technical fields, that restriction or area of particular usefulness will be indicated.

FIG. 3 is a schematic block diagram of an image scaling apparatus such as the apparatus 20 of FIGS. 1 and 2.

A source image (that is, an image to be scaled) is supplied as an input to the apparatus, as shown at the left hand side of the drawing. The apparatus generates a scaled output image, as indicated at the right hand side of the drawing.

The source image is processed by an optional pre-interpolation filter 100. The pre-interpolation filter performs bandwidth adjustments that may be required, such as softening or sharpening of an image. The filter 100 has separate parameters for the horizontal and vertical directions. The filter is a separable generic 11-tap horizontal and vertical symmetrical filter, where the coefficients can be completely user-defined. The output of the filter is passed to an interpolator 130.

Traditional methods of image interpolation typically use two one-dimensional filters to scale an image separately in the horizontal and vertical directions. An example of this is a poly-phase Sinc filter. This approach performs very well for horizontal and vertical lines, but diagonal lines are resolved less accurately and the picture quality can suffer. The present embodiments relate to an algorithm that uses a two dimensional approach to "shear" the data—in other words, applying a shear transformation to the two-dimensional digital filter and/or to the array of input pixels so as to map (or align) the operation of the filter to the detected image feature direction in at least one of the two axes, such as by shaping an edge feature to align either with the horizontal or vertical axis but (in embodiments of the invention) leaving the operation of the filter unchanged (at least in terms of its direction of operation) in respect of the other of the two axes. Once the data (or the interpolation filter) has been sheared by the required amount, the data can be interpolated by applying the digital interpolation filter to obtain the output pixels. When the shearing result cannot be used, the required interpolated value is produced using a standard Bicubic interpolation method. Embodiments of this combination algorithm have been shown in empirical tests to significantly increase picture quality.

Therefore, a feature of the interpolation filtering process is that interpolation effectively takes place along the direction of image features (such as lines or edges), In order to do this, the angles of features present in the image is found, by an interpolation angle determination unit 110 which detects the direction of an image feature at a pixel position to be interpolated. For an image feature, the angle and a measure of certainty for the angle, or in other words a degree of confidence in the detected image feature direction, are calculated using a statistical based method and other checks, the details of which are provided below.

Once the angle has been determined, information defining the angle is passed to a shearing interpolator 140, which also receives the filtered source image data from the filter 100 and generates output pixels based on interpolation along the direction of the image features detected by the interpolation angle determination unit 110. The filtered source image data is also passed to a non-shearing interpolator 150 which generates output pixels by a horizontal/vertical interpolation approach (that is, without reference to the image feature direction).

Information defining the measure of certainty in the currently detected image feature angle is passed to a controller 160. The controller 160 controls the operation of a mixer 170 which mixes, or (as extreme examples of mixing) selects between, the outputs of the shearing interpolator 140 and the non-shearing interpolator 150 to provide pixels of the output image. In effect, the output pixels are therefore selectively generated by applying and/or not applying the shear transformation, in dependence on the detected degree of confidence in the detected image feature direction. More specifically, a first version of an output pixel is generated by applying the shear transformation; a second version of that output pixel is generated without applying the shear transformation; and the first and second versions are mixed according to a ratio dependent upon the detected degree of confidence, to generate the output pixel. In embodiments of the invention the mixing operation is such that a higher degree of confidence in the detected image feature direction results in a higher proportion of the output pixel being derived from the first version.

The arrangement of FIG. 3 can be implemented in hardware, programmable or custom hardware such as one or more application specific integrated circuits or one or more field programmable gate arrays, as a general purpose computer operating under the control of suitable software, firmware or both, or as a combination of these. In instances where software or firmware is involved in the implementation of embodiments of the invention, it will be appreciated that such software or firmware, and a providing medium such as a storage medium (for example an optical disk) or a network connection (for example an internet connection) by which such software or firmware is provided, are considered as embodiments of the invention.

It will be understood that where specific functionality is described below, a unit to perform such functionality may be provided as the corresponding unit of FIG. 3.

Interpolation Angle Determination

The operation of the interpolation angle determination unit 110 will now be described. The unit 110 detects an interpolation angle associated with each pixel of the source image and also carries out some quality checks to detect whether the detected angle is a reliable one for use in interpolation.

In particular, the unit 110 generates the angle of interpolation ($\theta$) and the measure of certainty (certaintyFactor). This variable certaintyFactor, which provides a level of confidence as to how well the feature matches the angle ($\theta$) found, is used later in the process to calculate a mixing value for the mixer 170. The interpolation angle determination is conducted before any filtering is conducted using the detected angle.

The angle determination module operates according to a technique based upon finding the best direction for interpolation by minimisation of variance.

The angle determination process can be conducted (for example) on a greyscale image or separately on each GBR (green, blue, red) component. If the latter is used, then the GBR results can be combined (for example according to the standard ratios of G, B and R used in the generation of a luminance (Y) value) so as to generate a single output result. In one embodiment, separate GBR results are combined so as to give preference to the G result, then preference to the R result, then the B result.

In order to avoid finding incorrect angles in areas of low picture detail, the certainty level of an angle is set to indicate zero certainty if the variance (or standard deviation) of the pixels in a 3×3 neighbourhood around a current pixel under test is below a programmable threshold. The variance within this 3×3 neighbourhood is also used as an image activity measure in a GBR to greyscale conversion process.

An alternative image activity measure, which can save hardware or processing requirements, is to use a sum of absolute differences calculated with respect to a mean pixel value over the 3×3 block, the detected image activity representing differences in pixel value between pixels in a group, so that greater pixel differences indicate a greater image activity.

In either case, the image activity measure is derived separately for each of the three colour components G, B and R, in respect of a group of input pixels around a pixel position to be interpolated.

A benefit of converting the image to greyscale for the purposes of the unit 110, so that the angle finding process needs be conducted on only one channel rather than on three separate channels, is a potential reduction in hardware requirements. The GBR data could be converted to greyscale using the following formula:

$$Y = gCoeff*G + bCoeff*B + rCoeff*R$$

where, gCoeff and bCoeff, rCoeff are the standard colour conversion coefficients (that is, the coefficients used to generate a standard Y value from G, B and R values, one example being Y=0.2126 R+0.7152 G+0.0722 B). However, using fixed coefficients in this way, two very different colours in the GBR colour space could produce identical greyscale colours, and therefore a particular image feature might not be detected in the resulting greyscale image. Hence, a method to adaptively change the colour coefficients is used in embodiments of the invention to overcome this problem.

In the adaptive technique, in order to capture the detail in the image, the weighting from a particular colour component is increased when the detail in the image from a particular component is significantly greater than the detail in the other colour components. Therefore monochromatic test pixels are derived by combining the colour components of corresponding input pixels in relative proportions dependent on the detected image activities. The detail amount is measured using the image activity, as described above. The default colour conversion coefficients are adjusted using the image activities, as follows:

$$gCoeff' = gCoeff + \alpha \times ImageActivity(\text{GREEN})$$

$$bCoeff' = bCoeff + \beta \times ImageActivity(\text{BLUE})$$

$$rCoeff' = rCoeff + \gamma \times ImageActivity(\text{RED})$$

$$Y = \frac{gCoeff'*G + bCoeff'*B + rCoeff'*R}{gCoeff' + bCoeff' + rCoeff'}$$

where $\alpha$, $\beta$, $\gamma$ are programmable parameters, and Y is the greyscale pixel as an output of this part of the process and which is used by the unit 110 for angle determination, that is, for the detection of the direction of an image feature in a group of the monochromatic test pixels around a pixel position to be interpolated. The direction detection may comprise detecting a direction, within the group of monochromatic test pixels, for which pixels along that direction exhibit the lowest variation (such as standard deviation, variance or sum of absolute differences from a mean) in pixel value. This process aims to boost detail level which would be hidden during standard conversion methods. More generally, the arrangement aims to vary the relative proportions of the colour components in a monochromatic test pixel so that colour components with higher image activity contribute a generally higher proportion of the monochromatic test pixel, for example by modifying a set of coefficients defining the contribution of each colour component to a monochromatic pixel in dependence upon the detected image activity relating to that colour component.

The next stage of the process aims to find the best angle for interpolation, by determining which direction has the lowest variation. Here, the terms "lowest" and (to be used elsewhere) "minimise" are used merely to indicate that the lowest variation is detected amongst those variation values tested.

FIG. 4a schematically illustrates a region of 5×5 pixels of the source image, with a current pixel position under test 200 being at the centre of the 5×5 region. The aim is to detect an image feature direction relevant to the pixel 200. A black line (as an example of an image feature whose angle should be detected) extends from the top left of the region to the bottom right of the region. Using the notation of FIG. 4a, the angle of this image feature is considered to be 45°, where 0° is considered to be the horizontal, and angles are considered to increase in a clockwise direction from the horizontal.

FIG. 4a is a simplified example in which dashed lines 210, 220, 230, 240 indicate examples of possible interpolation angle or search directions. The 5 pixels that lie in each particular possible interpolation direction are shown in FIG. 4b, where each row of FIG. 4b represents the five pixels, passing through the pixel position 200, along that possible direction.

By considering the variance of the pixels for each search direction, it is clear visually that the 45° possible interpolation direction (along the line 210) contains the pixels with the lowest variance. This simple example has shown that the direction of a particular feature may be defined by the direction which has the lowest pixel variation.

In general, the variation of the pixel values along a line relating to a search or test direction can be measured using the variance (or standard deviation) of points in the search direction. An exhaustive search for every angle (within the resolution limits of the system) may be used in order to obtain the best angle. However, this process would require a large amount of hardware or other processing resources. Instead, therefore, in embodiments of the invention a set of mathematical expressions for the variance can be calculated and minimised to find the required direction, again within the resolution limits of the system.

In embodiments of the invention, the search for the minimum variance is calculated over a 5×5 pixel neighbourhood, with the pixel for which the angle is currently being calculated centred in the middle. The arrangement used means that it is not possible to search every direction using just one equation. Instead, respective sub-sets of all the directions are examined and the minimum variance is then found from among those results. Each sub-set of directions is referred to below as a "template". In total, eight templates are required in order to test every possible direction. One particular template is schematically illustrated in FIG. 5.

FIG. 5 shows the 5×5 array of source (input image, or filtered input image) pixels from which an angle is determined, with the current pixel under test 200 (labelled in FIG. 5 as a pixel e) in the centre of the array. Each pixel is indicated by a square box. Pixels a to i represent the source pixels that are required for this template. This particular template is used to find the best angle between 0° and 26°; another seven templates search between other sets of angles, as shown in FIG. 6a to FIG. 6h. The specific example of FIG. 5 corresponds to the template shown in FIG. 6h. In each template shown in FIGS. 6a to 6h, the range of angles tested by that template is illustrated as those angles between (and including) the acute intersection of the two lines labelled as $\phi=0$ and $\phi=1$.

For each template, the variable $\phi$ is allowed to vary from 0 to 1. The value of $\phi$ therefore maps to a measure of the angle. That is to say, for the template shown in FIG. 5, and using the angular notation introduced in FIG. 4a, when $\phi=0$, the corresponding angle is 0° and when $\phi=1$, the angle is 26°, more precisely:

$$\text{angle} = \tan^{-1}\left(\frac{\varphi}{2}\right)$$

The value of $\phi$ therefore indicates a particular search (or possible interpolation) direction. An example search direction is shown in FIG. 5 by a dashed search line 250, where regularly spaced points along the search line are indicated by the symbol "x" and are labelled j, k, l, m and n (note that because the search line passes through the centre of the pixel e, the "x" is shown overlying the letter "e" indicating that pixel). For most search directions, the points j, k, m and n do not lie exactly on a source pixel, so their values are determined using neighbouring pixel values. In particular, the values of these points are found by linear interpolation of the pixels above and below them (or to the left and right for other templates).

The angle that yields the lowest variation in j, k, l, m and n is considered the best angle for interpolation, amongst angles in the range which is under test using that template. Then the respective best angles obtained for each of the templates are compared, and amongst the set of best angles, the one which has the lowest variance is considered to be the overall best angle, that is, the angle for use as the output of the interpolation angle determination unit.

Although every template could be searched exhaustively at the full available accuracy, as an alternative (in order to save processing resources) an approximate search can first be conducted to indicate which of the eight templates contains the best angle. The approximate search could involve operating at a lower calculation accuracy and/or a more coarse angular resolution than those applicable to a more thorough method. Once the template containing the best angle has been identified, the more thorough method can then be applied to that template, to find a more accurate angle. This two-stage approach involves detecting a direction selected from a first set of directions, for which pixels along that direction exhibit the lowest variation in pixel value; and detecting the image feature direction by detecting a direction selected from a second set of directions around the detected first direction, the second set having a higher resolution than the first set of directions, for which pixels along that direction exhibit the lowest variation in pixel value.

A technique for such an approximate search will now be described.

In one example, as an approximate search in order to find the best template, a test angle at a value of $\phi$ mid-way through each template ($\phi=\frac{1}{2}$) is used to find the variance of the pixels on the test line. This test angle provides an approximation of the variance values that this template could produce. To ease hardware requirements, only the central three pixels (k, l and m, where l=e anyway) may be used for this variance calculation. Using $\phi=\frac{1}{2}$, the pixels value k, l and m are found.

$$k = \frac{1}{2}c + \frac{1}{4}d$$

$$l = e$$

$$m = \frac{1}{2}g + \frac{1}{4}f$$

Then the variance of these three pixels can be calculated. To ease hardware requirements further, an approximation to the standard deviation may be calculated as a sum of absolute differences (SAD) value rather than the full variance expression:

$$sd = \sqrt{\Sigma(x-\bar{x})^2} \approx \Sigma|x-\bar{x}|$$

$$\text{mean}(\phi) = (k+l+m)/3$$

$$sd(\phi) \approx |k-\text{mean}(\phi)| + |l-\text{mean}(\phi)| + |m-\text{mean}(\phi)|$$

Note that for a true standard deviation, the values shown above should be divided by $\sqrt{3}$. However, as the test is for which template provides a minimum value of the expression, a constant factor of $\sqrt{3}$ may be ignored.

The minimum standard deviation or SAD value from the eight approximate values derived from the eight templates indicates the template that contains the best direction. A more accurate calculation can now be conducted on that single template. The accurate search process will now be described.

In order to find the best angle for the single template identified for further examination, the angle corresponding to the minimum variance should be found. This can be derived by minimising an expression for the variance.

Pixel values for the five pixels j to n on a test line 250 as a function of $\phi$ are given by the following equations:

$$j = (1-\varphi)a + \varphi b$$

$$k = \left(1 - \frac{\varphi}{2}\right)c + \frac{\varphi}{2}d$$

$$l = e$$

$$m = \left(1 - \frac{\varphi}{2}\right)g + \frac{\varphi}{2}f$$

$$n = (1-\varphi)i + \varphi h$$

The differentials of these expressions are:

$$\frac{dj}{d\varphi} = b - a$$

$$\frac{dk}{d\varphi} = \frac{1}{2}(d-c)$$

$$\frac{dl}{d\varphi} = 0$$

$$\frac{dm}{d\varphi} = \frac{1}{2}(f-g)$$

$$\frac{dn}{d\varphi} = h - i$$

By finding the value of $\phi$ which corresponds to the minimum variance of j, k, l, m and n, the best direction for this template may be obtained. The variance of the search line is given by:

$$\text{var}(\varphi) = \frac{j^2 + k^2 + l^2 + m^2 + n^2}{5} - \frac{(j+k+l+m+n)^2}{25}$$

Differentiating with respect to $\phi$:

$$25\text{var}'(\varphi) = 10j\frac{dj}{d\varphi} + 10k\frac{dk}{d\varphi} + 10l\frac{dl}{d\varphi} + 10m\frac{dm}{d\varphi} +$$
$$10n\frac{dn}{d\varphi} - 2\left(\frac{dj}{d\varphi} + \frac{dj}{d\varphi} + \frac{dj}{d\varphi} + \frac{dj}{d\varphi} + \frac{dj}{d\varphi}\right)(j+k+l+m+n)$$

Substituting the equations given above for the pixel values j to n as a function of $\phi$, and the expressions derived above for the differentials of those values with respect to $\phi$, and then equating to 0, the value of $\phi$, $\phi_{min}$, that corresponds to the minimum variance can be found:

$$\varphi_{min} = -\frac{\begin{aligned}&[b-a]\times[8a-2c-2e-2g-2i] + \\ &[d-c]\times[4c-a-e-g-i] + \\ &[f-g]\times[4g-a-c-e-i] + \\ &[h-i]\times[8i-2a-2c-2e-2g]\end{aligned}}{\begin{aligned}&[b-a]\times[8(b-a)-2(d-c)-2(f-g)-4(h-i)] + \\ &[d-c]\times[2(d-c)-(f-g)-2(h-i)] + \\ &[f-g]\times[2(f-g)-2(h-i)] + \\ &[h-i]\times[8(h-i)]\end{aligned}}$$

This value of $\phi_{min}$ is then clipped to the range of 0 to 1, so that only valid values for the template are formed.

The $\phi_{min}$ value calculated represents the angle that will be used for interpolation. At this stage the certaintyFactor of this angle is given as 100% confident, but this value may be subsequently modified by various checks to be described below.

In order to detect aliased lines or incorrect detection of an angle, a number of checks are processed at this stage using the 8 template SAD values derived as part of the approximate search described above.

Check 1:

The presence of multiple minima is detected. If any of templates, other than the two templates directly neighbouring the minimum SAD value, has a SAD that is equal to the minimum SAD value, the data is considered to be aliased and therefore this angle cannot be used. The certaintyFactor is set to 0 (completely uncertain) for this pixel.

Check 2:

Angles should not be detected in areas of low picture detail. If the image activity (as derived above) for this pixel is below a programmable threshold, the angle is rejected by setting the certaintyFactor to 0.

Check 3:

For a well defined line, the SAD perpendicular (perpSAD) to the best direction should be significantly smaller than the minimum SAD (minSAD). As the perpendicular SAD approaches the minimum SAD value, the confidence value, certaintyFactor, should be increasingly penalised if a smooth fading arrangement is used, or the angle should be rejected entirely (by setting certaintyFactor to 0) if the smooth fading arrangement is not used. The perpendicular template is defined as the template that is 4 templates away from the minimum template where each mapping is shown in the table below.

| Minimum Template | Perpendicular Template |
| --- | --- |
| FIG. 6a | FIG. 6e |
| FIG. 6b | FIG. 6f |
| FIG. 6c | FIG. 6g |
| FIG. 6d | FIG. 6h |
| FIG. 6e | FIG. 6a |
| FIG. 6f | FIG. 6b |
| FIG. 6g | FIG. 6c |
| FIG. 6h | FIG. 6d |

The certaintyFactor is then set as in the following pseudocode, which encompasses all three of the above checks:

```
bFadingTriggered=false;
if(bMultipleMinimaDetected)
{
    certaintyFactor=0; // check 1
}
else if(imageActivity<imageActivityThreshold)
{
    certaintyFactor=0; // check 2
}
else if(bSmoothFadingRequired)
{
    diff = perpSAD-minSAD
    perpFadeAmount=1<<perpFade
    if(diff<templateDiffThresh)    // this angle is no good
        fade_cert=255;
    else if(diff>templateDiffThresh+perpFadeAmount)
        fade_cert =0;              // this angle is good
    else if((perpFade-8)>0)
        fade_cert=256-((diff-templateDiffThresh)>>(perpFade-8))
    else
        fade_cert=256-((diff-templateDiffThresh)<<(8-perpFade))
    certaintyFactor=255-fade_cert; // invert all the bits
    bFadingTriggered=(cert!=255) // or fade_cert!=0
}
else if( (perpTemplateTolerance*perpSAD)>>5) < minSAD)
{
    certaintyFactor=0;      // check 3, no fading
    bFadingTriggered=true;
}
else
    certaintyFactor=255
``` where perpFade, imageActivityThreshold, templateDiffThresh, perpTemplateTolerance and bSmoothFadingRequired are programmable constants, and certaintyFactor varies between 0 (no certainty) and 255 (full certainty).

In order to increase the accuracy of the angle finding method, in an embodiment of the invention results from neighbouring templates can be combined so as to improve the likelihood of identifying the correct angle. Results from templates offset from one another in the image by various offset amounts (templates based on different respective centre pixels) are combined together in order to form a composite decision on the best angle to use; the idea behind this technique being that if the angular detection is reliable, the offset templates should in principle yield similar angles.

Figure 7:
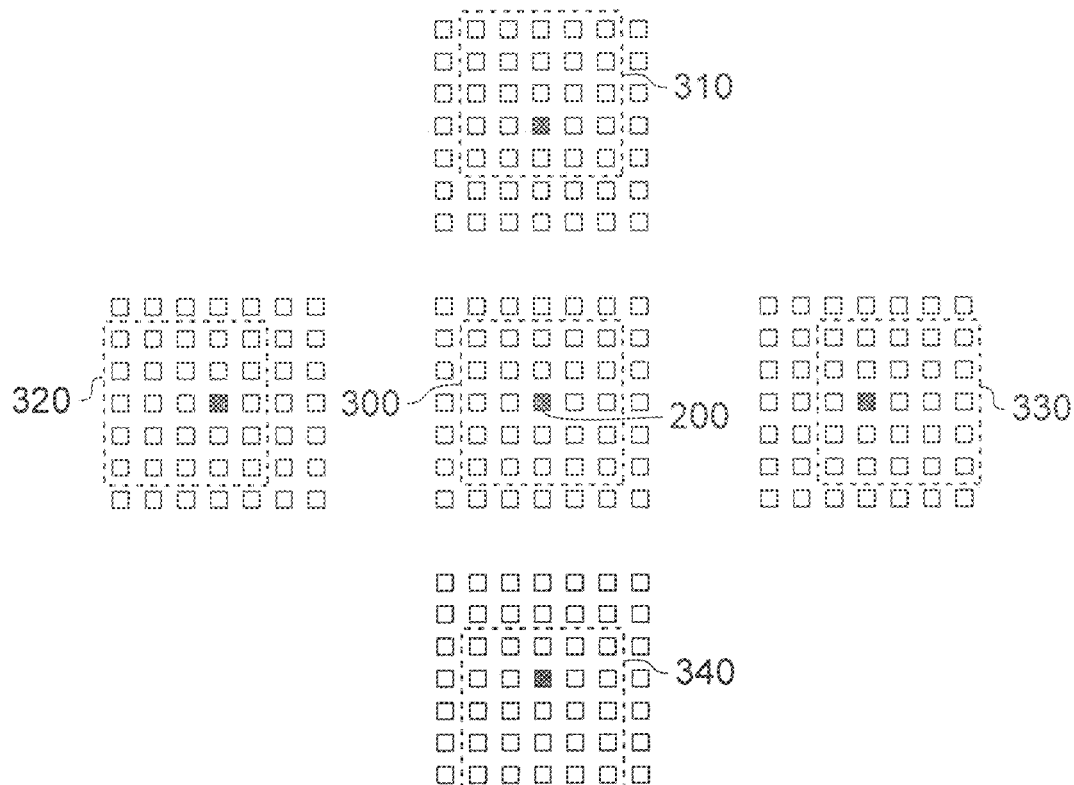
FIG. 7 schematically illustrates a set of template offset positions.

For the initial approximate best template search, standard deviations from the same template offset one pixel above, one pixel below, one pixel left and one pixel right of the current template are added to the results for the template at the current pixel position. This sum of five values is carried out in respect of each of the eight templates. The minimum combined standard deviation (or approximation to standard deviation, as described above) for a template is then found to indicate the best template for the more accurate testing. The offset positions are shown below in FIG. 7. The shaded pixel is the current source pixel, while the dashed boxes 300 . . . 340 represent the pixels that will be used in the template calculations:

Box 300: no offset
Box 310: offset one pixel upwards
Box 320: offset one pixel to the left
Box 330: offset one pixel to the right
Box 340: offset one pixel downwards Once the best template has been identified, the more accurate method can be used to find the angle. Again, neighbouring templates can be adaptively combined to produce the best possible result. Neighbouring templates that are offset in the horizontal direction are combined together for horizontal lines, such as those indicated by the templates of FIGS. 6a, 6b, 6g and 6h, as shown in FIG. 8, which illustrates an angle finding process based on the summed results at the template positions indicated by the boxes 320, 300 and 330.

The equation for $\phi_{min}$ can be adapted to incorporate this enhancement by splitting it into separate numerator (num) and denominator (den) components as follows:

$$num = [b-a] \times [8a - 2c - 2e - 2g - 2i] + [d-c] \times [4c - a - e - g - i] +$$
$$[f-g] \times [4g - a - c - e - i] + [h-i] \times [8i - 2a - 2c - 2e - 2g]$$
$$den = [b-a] \times [8(b-a) - 2(d-c) - 2(f-g) - 4(h-i)] +$$
$$[d-c] \times [2(d-c) - (f-g) - 2(h-i)] +$$
$$[f-g] \times [2(f-g) - 2(h-i)] + [h-i] \times [8(h-i)]$$

Figure 8:
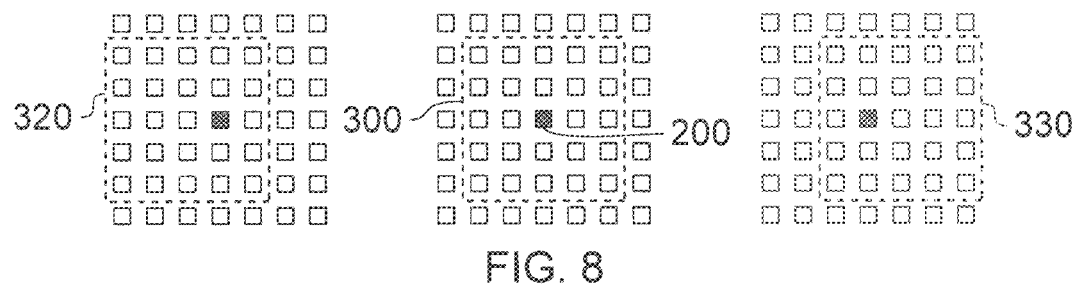
FIGS. 8 and 9 schematically illustrate the combination of results from neighbouring templates.

The values num and den value are calculated for each template at each pixel offset position, as indicated in FIG. 8, for the best template. These num and den values are then summed for each of the three offset templates to generate summed values, numSum and denSum, which are then used to calculate a value for $\phi_{min}$:

$$\varphi_{min} = \frac{numSum}{denSum}$$

Figure 9:
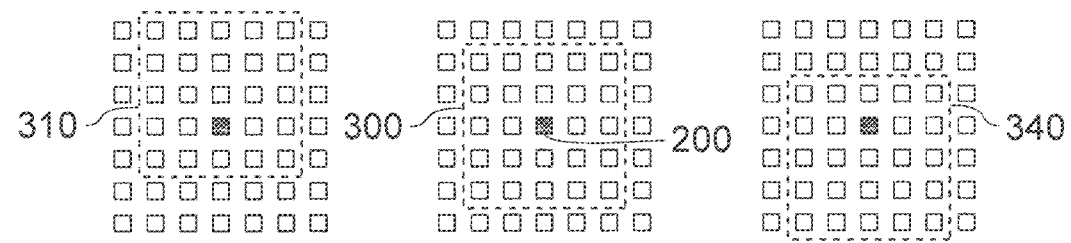

For lines that are more vertical, such as those found by the templates shown in FIGS. 6c to 6f, the results from vertical offset templates are combined. These are shown in FIG. 9, which illustrates an angle finding process based on a combination of the results of three template positions indicated by the boxes 310, 300 and 340. The same procedure (as that described with reference to FIG. 8) is then used to find the angle.

If (in the neighbouring template scheme as described above) there are two neighbouring templates that have similar standard deviation, and the $\phi$ values are sufficiently close to each other, then the results of the angle detection are compared and combined. This can have the benefit of smoothing transitions between neighbouring pixel positions. The $\phi$ value from each template is averaged to form an updated $\phi$ value. The minimum standard deviation must be a certain percentage (expressed, for example, as a proportion of the minimum standard deviation of the template 300) from that of the neighbouring template in order to perform this test, this percentage being a programmable value. Secondly, the $\phi$ for both the template 300 and neighbouring template must be within a given programmable tolerance value (expressed as a percentage or an absolute difference).

The "neighbouring template" is in fact selected as a function of the best template and the φ value calculated above. For example, if the best template was the template of FIG. 6g, and φ was >0.5, the neighbouring template would be the template of FIG. 6h. More generally, the neighbouring template is chosen to be the template which could potentially also produce the best angle that has been calculated. The φ for the neighbouring template is then calculated using the same procedure described previously, and then compared with the best template's results.

So for example, if FIG. 6g was considered to be the best template with φ=0.9, the neighbouring template (FIG. 6h) φ is then calculated. If the SAD for the best template and neighbouring template closely match, and the neighbouring template also produces φ=0.9 (or within a tolerance of 0.9), this may indicate that the image feature actually lies inbetween the two templates, so the values can be combined to actually produce φ=1.0.

In the present embodiments the interpolator in fact uses the tan of the interpolation angle, and therefore the actual angle, θ, does not need to be calculated. In other words, φ(=2·tan (angle within that template's range)) can be directly used during the interpolation process, noting which quadrant the angle described by the template resides. However, for ease of discussion, this description will still refer to the interpolation angle in degrees rather then the tan of the angle.

A number of checks can help to provide a smooth transition between neighbouring angles and areas of uncertainty.

An average angles algorithm aims to smooth angles between neighbouring values to provide consistent angles. A total of three angles are compared in this test: the angle derived in respect of the current pixel position under test, and the angles derived in respect of two neighbouring pixel positions.

The neighbouring pixel positions could be chosen in dependence on the approximate angle found in respect of the current pixel position. So, if the "best" template for the current pixel position was found to be the template of FIG. 6a or 6h (which represent near-horizontal directions) then the test could be applied to the two horizontally neighbouring pixels. For the templates in FIGS. 6b and 6c, pixels to the lower left and upper right of the current position can be used. For the templates in FIGS. 6d and 6e, pixel positions above and below the current position can be used. For the templates in FIGS. 6f and 6g, pixels to the lower right and upper left of the current position can be used. However, in embodiments of the invention, just the left and right horizontal neighbours are used in this test.

The process (as shown in the schematic flow chart of FIG. 10) tests the current angle, B, against its neighbours, A and C and averages them accordingly. Only confident angles are averaged together: if the confidence level (certaintyFactor) is below a certain threshold, the current angle is unaltered. At each stage, each angle is checked for angle wrap around, for example angles of −89° and 89° should average to form −90° (or 90°) but not 0°. The average angles algorithm can be enabled using a parameter and the thresholds for determining whether the angles are similar or dissimilar are programmable.

Figure 10:
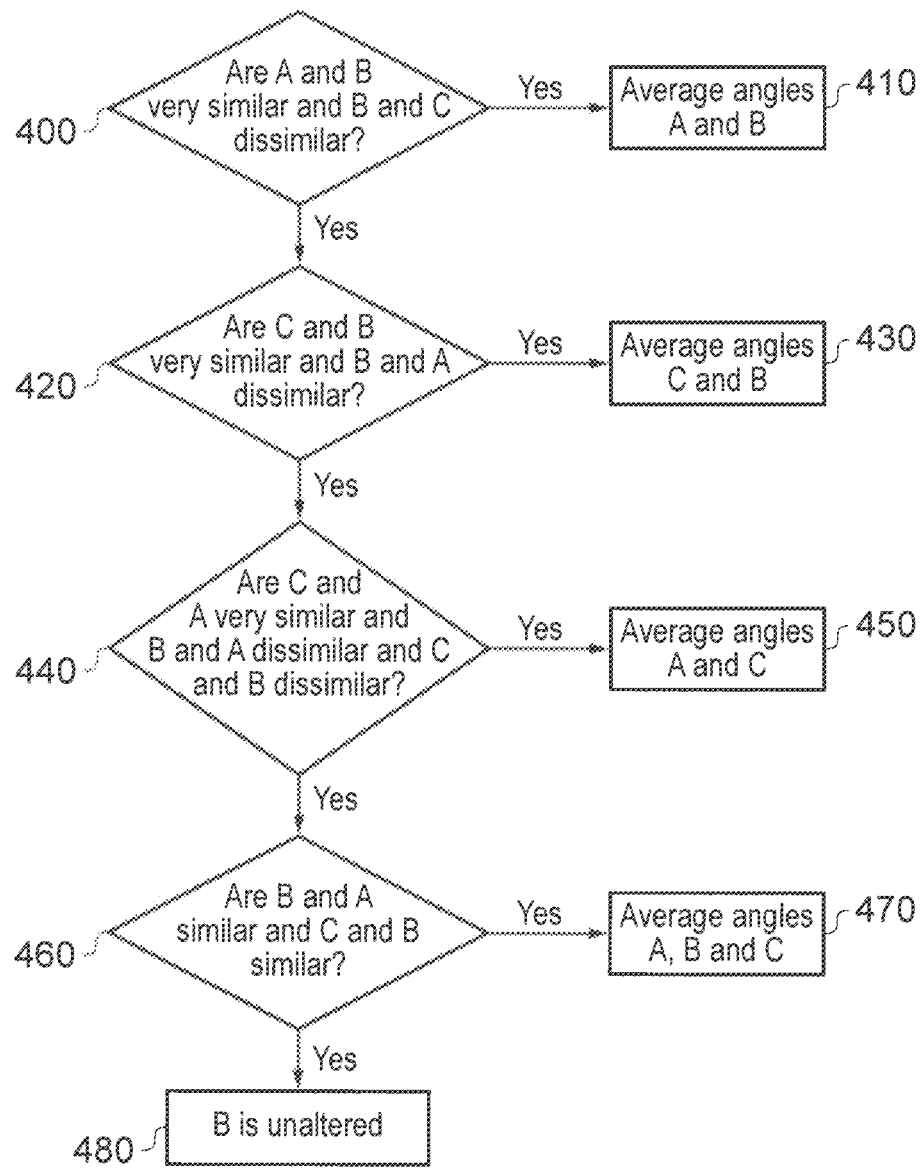
FIG. 10 schematically illustrates an angle averaging process.

Referring to FIG. 10, if (at a step 400) the angles A and B are found to be very similar, but the angles B and C are dissimilar, then at a step 410 the angles A and B are averaged to form an updated interpolation angle and the process ends in respect of the current pixel A. If at a step 420 the angles C and B are very similar, but the angles B and A are dissimilar, then at a step 430 the angles C and B are averaged. If at a step 440 the angles C and A are very similar, but the angles B and C are dissimilar, then at a step 450 the angles C and A are averaged. If at a step 460 the angles A and B, and B and C, are similar, then at a step 470 the angles A, B and C are averaged. At a step 480, if none of the above conditions applies, then the angle B is unaltered. In this process, the term "very similar" means that the angles are the same to within a first threshold amount (for example 5°); the term "similar" means that the angles are the same to within a second threshold amount (for example 7°); and the term "dissimilar" means that the angles differ by at least a third threshold amount (for example 5°). However, the first to third threshold amounts need not necessarily be different; they could all be the same amount.

A 'Soften angles' algorithm helps to ensure that the surrounding neighbourhood of angles in a 3×3 block of pixels are all sufficiently similar. The maximum difference between the current angle and the eight surrounding angles is found, and the certaintyFactor is then penalised according to the function:

$$\text{certaintyFactor} = \text{certaintyFactor} \times (1.0 - (\text{biggestAngularDiff}/90.0))$$

For example, if the biggest angle difference (biggestAngularDiff, expressed as an absolute difference in degrees in this example) is found to be 45°, the certaintyFactor would be halved. This check will therefore create a halo or surrounding region of uncertainty (represented by reduced certaintyFactor values) in image areas where the angle is changing rapidly. This function can help to prevent features with very different angles from bleeding into each other during the interpolation process. In an embodiment, an equivalent of this equation uses the tan notation relating to tan (φ) instead of the angle itself.

As a further refinement, angles with a low certaintyFactor (below a threshold amount) are not included in the soften angles process. This is to avoid those angles (which have already been detected as less reliable) affecting the certaintyFactor of other angles.

Figure 11:
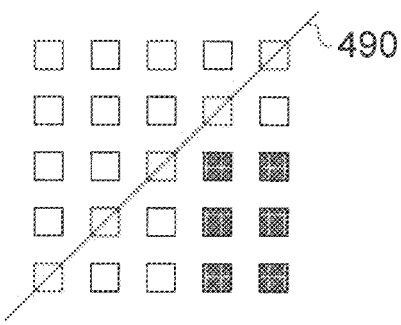
FIG. 11 schematically illustrates an image corner.

A corner detection function aims to detect corners to prevent interpolation in the incorrect direction. An example portion of an image is illustrated schematically in FIG. 11.

In this example, the minimum variance for this feature was found at 45°, as shown by the line 490. However, a confident angle cannot be provided for this particular feature, as (in this example) the direction of the feature is ambiguous at this point. The angle detected should not therefore be allowed to be used.

The corner detection function searches the two neighbouring pixels in the direction found for the current pixel (the direction indicated by the line 490) to ensure that at least one neighbour is consistent with the current angle. If neither test neighbour is consistent, this pixel is deemed to be a corner and its certaintyFactor is penalised (brought closer to zero, if not zero already).

The two neighbouring pixels that are used in the consistency search are determined from the template for which the best angle was determined. For example, if θ was found to be 40°, this would have corresponded to the template of FIG. 6g. The two neighbouring pixels required are the same as those described above in respect of the angle averaging process. The two neighbouring pixels are checked separately against the current pixel.

First, the respective angles are checked: the angle difference between the two neighbours (between the current pixel and the neighbour under test) must be below a specified threshold.

Second, the certaintyFactor of that neighbour is checked: this is to ensure that the current pixel is being compared with a valid result.

If both angle and certainty checks are satisfied in respect of either or both of the two neighbours, this angle is deemed good. This process is repeated for both neighbouring pixels, and if both tests are deemed 'bad', the current angle is not consistent with either neighbour, and it is therefore classified as a corner (so the certaintyFactor is penalised as described above).

Further procedures aim to ensure that corners do not produce any spurious effects during the interpolation process.

A "soften corners" algorithm aims to ensure that artefacts caused by the ambiguity of interpolation at detected corners are removed. This is achieved by penalising the certaintyFactor of any pixels at corners and also any pixels neighbouring any corner.

For each pixel, a 3×3 neighbourhood is searched. If no corner is detected in this neighbourhood, the certaintyFactor of the current pixel is unaltered, however, if a corner is found in the 3×3 block, the following penalisation process is performed.

If a corner has been detected in the 3×3 region, the certaintyFactor values in this region are compared and a maximum gradient between the certaintyFactors is enforced and is not permitted to exceed a programmable value.

The gradient is calculated as follows:

$$\text{thisGrad} = (dx + dy) \times \text{allowedGrad} + \text{thisCertaintyFactor}$$

where allowedGrad is a programmable maximum allowed gradient, thisCertaintyFactor is the neighbouring certaintyFactor currently being tested, and dx and dy are the magnitude of the pixel position offsets relative to the centre of the pixel for which certaintyFactor is being tested. If a corner is present at the neighbour value currently being tested, thisCertaintyFactor is set to zero, indicating to the interpolator that this angle cannot be trusted and should not be used.

Figures 12, 13:
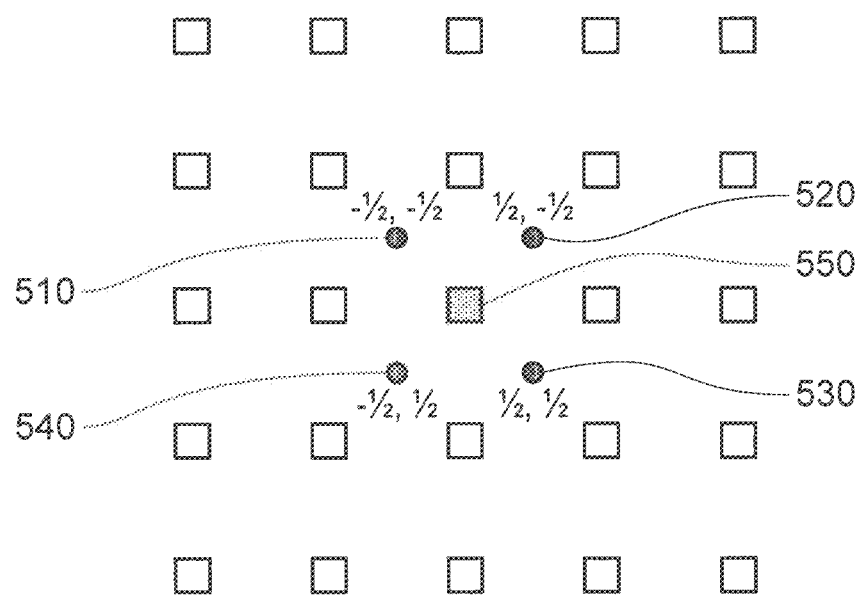
FIG. 12 schematically illustrates a corner softening process.
FIG. 13 schematically illustrates pixel positions in a corner verification process.

The values of the gradients in the neighbourhood are recorded and the minimum thisGrad indicates the new certaintyFactor for the current pixel, as illustrated in FIG. 12.

In the example of FIG. 12, when analysing around the centre pixel 500, a corner is present in its 3×3 neighbourhood (as illustrated by a "1"). The minimum grad value is found when the top-left adjacent pixel (the pixel that indicated it had a corner) is tested. For this case, dx=1, dy=1, thisCertaintyFactor is set to 0 and not 0.8, as a corner is present and allowedGrad has been set to 0.15 in this example. Therefore, thisGrad is calculated as (1+1)*0.15+0.0=0.30 and the certaintyFactor is updated to be the minimum of thisGrad and certaintyFactor. This process will prevent inconsistent angles from being acted upon by the interpolator and will also allow a gradual fade between these inconsistent results and neighbouring values.

A corner consistency check will now be described.

If incorrect angles are used during the interpolation stage, artefacts may be added into the resulting image. To reduce the possibility of this, the corner detection and other algorithms are used to verify the result. However, there may still be occasions where a non-ideal result is obtained.

The aim of the corner consistency check is to reduce the possibility of artefacts even further. This check can be conducted on all GBR channels, or on a single green channel, or on a hybrid greyscale channel, depending on the system configuration. The corner consistency check involves deriving a verification pixel value from two or more groups of input pixels each based around a respective pixel position, using the detected directions associated with those pixel positions; comparing the values of the verification pixel derived in respect of each group; and varying the degree of confidence associated with those input pixels such that a greater variation in the values of the verification pixel is associated with a lower degree of confidence.

During corner verification, each pixel is tested in turn, by estimating the value of sub-pixel positions at $\pm\frac{1}{2}, \pm\frac{1}{2}$ a pixel position relative to that pixel, as illustrated in FIG. 13, where test points are shown as circles 510, 520, 530, 540, and the current source pixel position is shown as a square 550.

During interpolation (as described below), the output pixels are formed using data surrounding the nearest source pixel. If there is to be continuity in the picture, the interpolated pixels surrounding one source pixel must be similar to those surrounding the neighbouring pixel at the border.

Therefore, the four source pixels that surround the ½, ½ point must produce similar estimates at that ½, ½ point; if they do not, at least one of the source pixels is associated with the wrong interpolation direction. Hence the certaintyFactor can be controlled by how well the 4 values at each of the corners agree. Note that in order to save hardware or other processing resources, only linear interpolation is used during this process.

A filtering process forming part of the interpolation stage (described below) is taken into account when calculating the estimate of each of the points. Therefore a total of 5 pixels must be interpolated and smoothed using the correct filter.

In FIG. 14, the value of ½,−½ (circle 560) is to be calculated, using the direction 570 of the image feature 580 found at the current source pixel. In order to calculate the filtered value at the position 560, a set of 5 values must be found, those being the unfiltered values at the points 560, 590, 600, 610, 620. These 5 values are passed through the 5-tap mid-pass/low-pass filters described below to produce a modified value at position 560.

To calculate the 5 unfiltered values, the values at the points 630, 640, 650, 660, 670 and 680 need to be calculated. This is performed by linear interpolation of the pixels above and below them (or, depending on the angle of the line, to the left and right). Since linear interpolation is being used, the 5 values 560, 590, 600, 610, 620 are simply the average of the two values at the interpolated points on either side.

Once the required corner pixels are found, the consistency check can be conducted to ensure that the surrounding pixels have produced similar values. Consider the example shown in FIG. 15.

Pixel e 700 represents the current source value and $e_{\pm 1/2, \pm 1/2}$ are the filtered corner pixels derived with pixel e as the centre pixel. Each corner pixel is compared to the corresponding corner pixels obtained using the other source pixels as centre pixels. For example, the $e_{1/2, 1/2}$ corner is compared against $f_{-1/2, 1/2}$, $h_{1/2, -1/2}$ and $i_{-1/2, -1/2}$ in turn; for a consistent boundary at least two of these corners must be similar to $e_{1/2, 1/2}$, their absolute differences must be small (below a threshold value). The differences are calculated as follows:

$$\text{difference\_ef} = \text{Min}(|e_{1/2,1/2} - f_{-1/2,1/2}| - \text{threshold}, 0)$$

$$\text{difference\_eh} = \text{Min}(|e_{1/2,1/2} - h_{1/2,-1/2}| - \text{threshold}, 0)$$

$$\text{difference\_ei} = \text{Min}(|e_{1/2, 1/2} - i_{-1/2,-1/2}| - \text{threshold}, 0)$$

where the threshold is calculated as:)

$$\text{MaxError} = \text{Max}(|e_{1/2,1/2} - e_{-1/2,1/2}|, |e_{1/2,1/2} - e_{1/2,-1/2}|)$$

$$\text{MinError} = \text{Min}(|e_{1/2,1/2} - e_{-1/2,1/2}|, |e_{1/2,1/2} - e_{1/2,-1/2}|)$$

$$\text{threshold} = \alpha \times \text{MinError} + (1-\alpha) \times \text{MaxError}$$

The error values are calculated by finding the differences of the adjacent corner values and the threshold is then calculated by linearly interpolating the minimum difference and the maximum difference, where a is a programmable threshold.

The minimum two of the three difference values are then summed together. This process is repeated for each of the surrounding four corner values.

If the corner is consistent with its neighbours, the summed difference value will equal 0, so no penalisation is necessary. However, if the corner values are inconsistent, which indicates that a discontinuity might occur during interpolation, the summed difference will be high, therefore the pixel's certaintyFactor should be penalised accordingly. The maximum summed difference (maxSummedDifference) value from the four corner values is used to penalise the certaintyFactor.

$$\text{penalty} = \text{Max}(maxSumedDifference, 512)$$

$$certaintyFactor' = \frac{certaintyFactor \times (512 - \text{penalty})}{512}$$

Where certaintyFactor' is the modified value of the certaintyFactor.

Interpolation

Using the angles θ and the certaintyFactor calculated by the unit 110, the interpolator 130 produces an output pixel. The certaintyFactor associated with each source pixel indicates to the interpolator whether the result of the shearing interpolator 140 can be used for the output. If the sheared value cannot be used, the interpolator must use the pixel produced using the non shearing interpolator 150. A mixer control value is generated by the controller 160 in respect of each output pixel, indicating to the mixer 170 whether to output the shear interpolated pixel, the non shearing interpolated pixel or a weighted combination of the two.

The shearing interpolator and the non-shearing interpolator will now be described.

Shearing Interpolation

The present arrangement uses a shearing filter to carry out the interpolation. In order to explain the operation of the shearing filter, previously proposed approaches will first be discussed in brief.

Filtering using a previously proposed two-dimensional (2D) Sinc filter involves convolving together a one-dimensional (1D) filter to scale horizontally with a corresponding filter to scale vertically, to produce a filter that is able to filter and scale an image in both directions with a single 2D filter matrix. The two dimensional filter resulting from the convolution of the two orthogonal filters is (at this stage) aligned to the horizontal and vertical axes.

Figure 16:
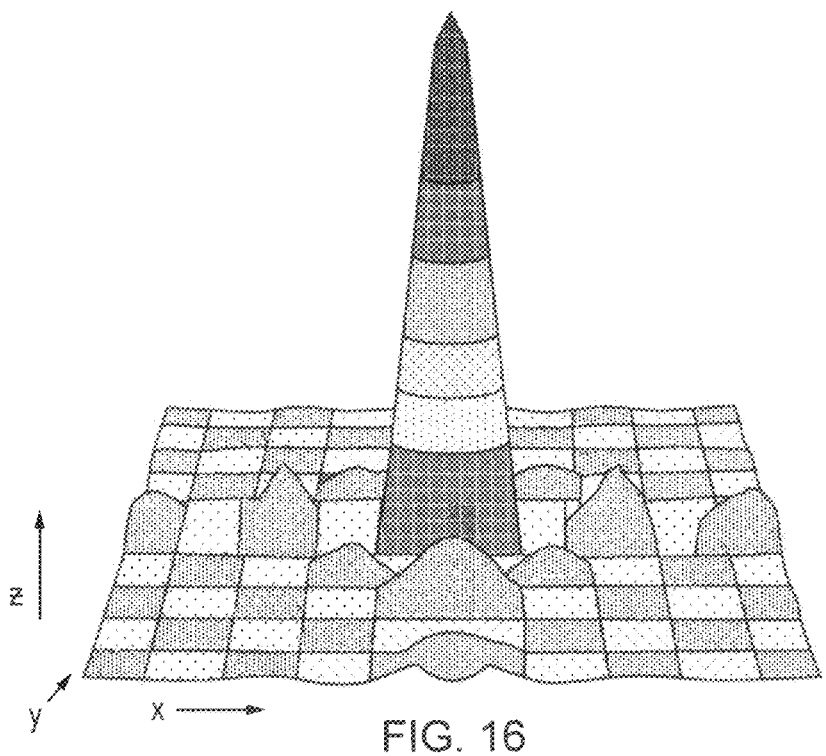
FIGS. 16 and 17 schematically illustrate a Sinc filter response.
Figure 17:
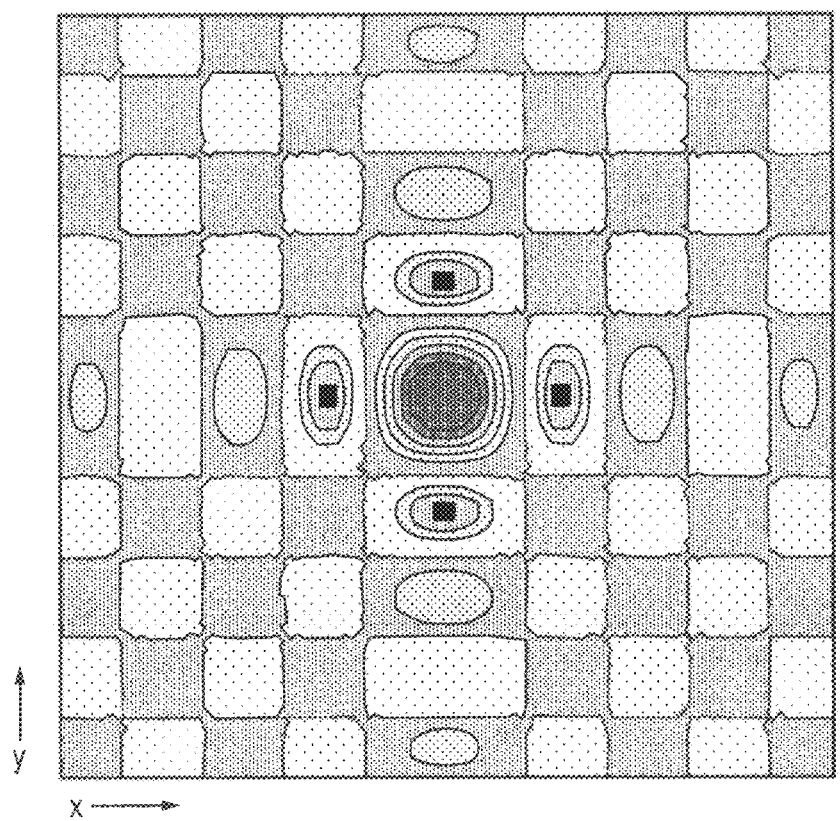

FIGS. 16 and 17 provide schematic illustrations of such a 2D Sinc filter. FIG. 16 is a 3D projection representing the filter coefficients, where the x axis (horizontal on the page) and the y axis (oblique on the page) represent spatial coordinates in the plane of the image with the origin (0,0) in the centre of the drawing, and the z axis (vertical on the page) represents the amplitude of the filter coefficient at that spatial position. The filter coefficients have a peak amplitude at the origin. FIG. 16 is shown with different degrees of shading representing bands of different filter coefficient amplitudes. This shading representation is carried over into FIG. 17 which provides a view along the z axis onto the x-y plane, and will be referred to as an overhead view of the filter coefficients. Peaks (high points in the z direction) in the coefficients shown in FIG. 16 correspond to darker regions in the overhead view of FIG. 17.

One technique of edge directed Sinc filtering is to rotate such a two dimensional filter matrix, so that the principal axis of the filter is aligned to the detected edge or image feature. The theory behind this principle is to align most of the energy of the filter along the length of the image feature. An additional stage is to increase the bandwidth of the filter in the direction perpendicular to the orientation of the edge in order to preserve the sharpness of the edge. The aim of the bandwidth increase is again to further increase the energy of the filter along the image feature line.

Although this 2D edge directed Sinc filter method can produce some good results, there is a fundamental difficulty with the algorithm. Consider interpolating a pixel at offset zero in both the vertical and horizontal direction (fully aligned with a source pixel) that lies on a feature that has an orientation of 45°. The Sinc filter rotation method described above would yield a filter that is aligned to the feature in the image.

Figure 18:
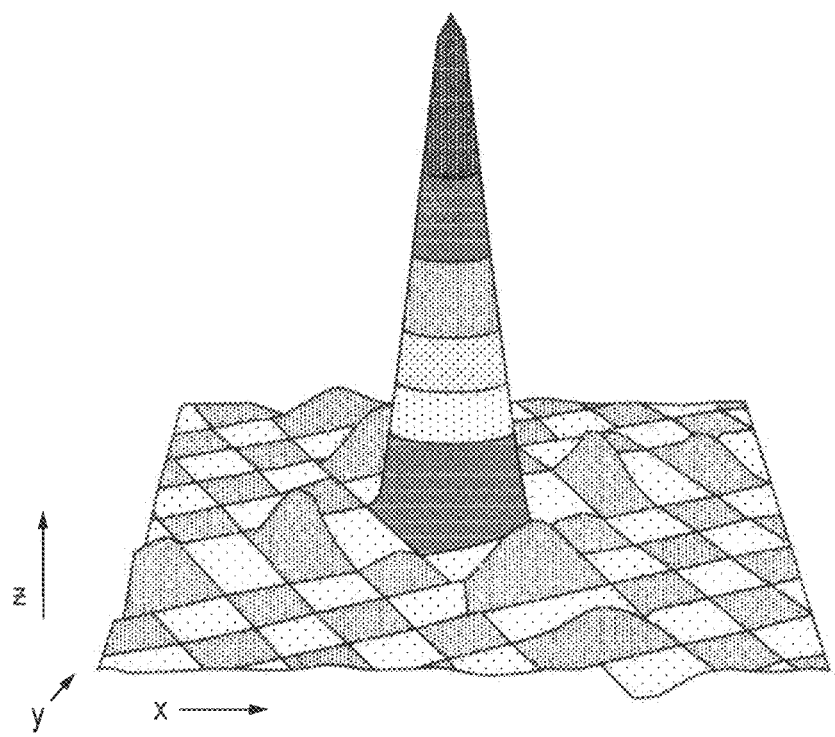
FIGS. 18 and 19 schematically illustrate a rotated Sinc filter response.
Figure 19:
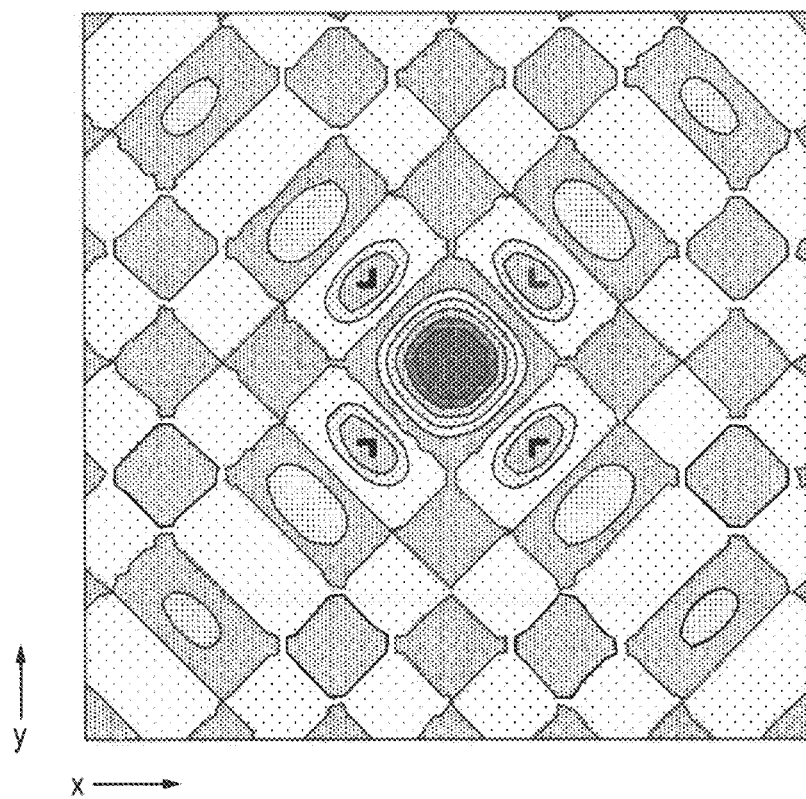

An example of a Sinc filter rotated by 45° is shown schematically in FIGS. 18 and 19, which follow a shading similar notation to FIGS. 16 and 17 respectively. FIG. 18 is a 3D representation of the rotated filter, and FIG. 19 is an overhead view of the filter.

A filter produced from a non-rotated Sinc algorithm would have produced a two dimensional impulse response. Therefore, the interpolator would have returned the source pixel.

But as the filter has now been rotated, the filter zero points do not align to the source data, and hence the interpolator does not return the source pixel. The effect of this is that the bandwidth has been changed in both directions unintentionally and, as a result, the output pixel is not as expected. The problems for this method increase further for non zero offset values (output pixel positions not aligned with source pixels); the edge directed rotation filter can produce significant striping artefacts when used for images with angled features.

Therefore, rather then use rotation, the present embodiments provide another method to shape the filter by shearing the filter.

Figure 20:
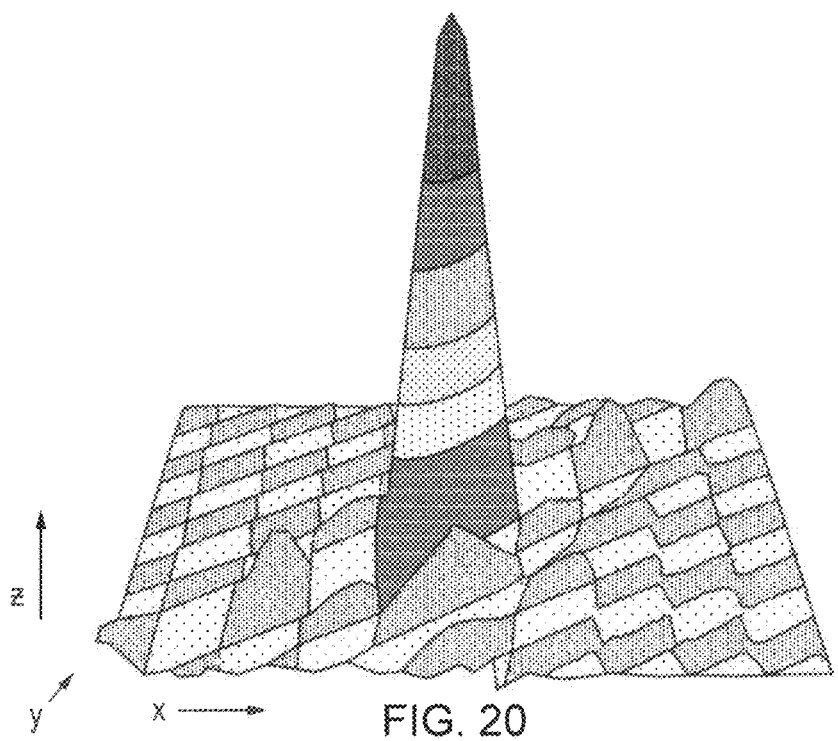
FIGS. 20 and 21 schematically illustrate a sheared Sinc filter response.
Figure 21:
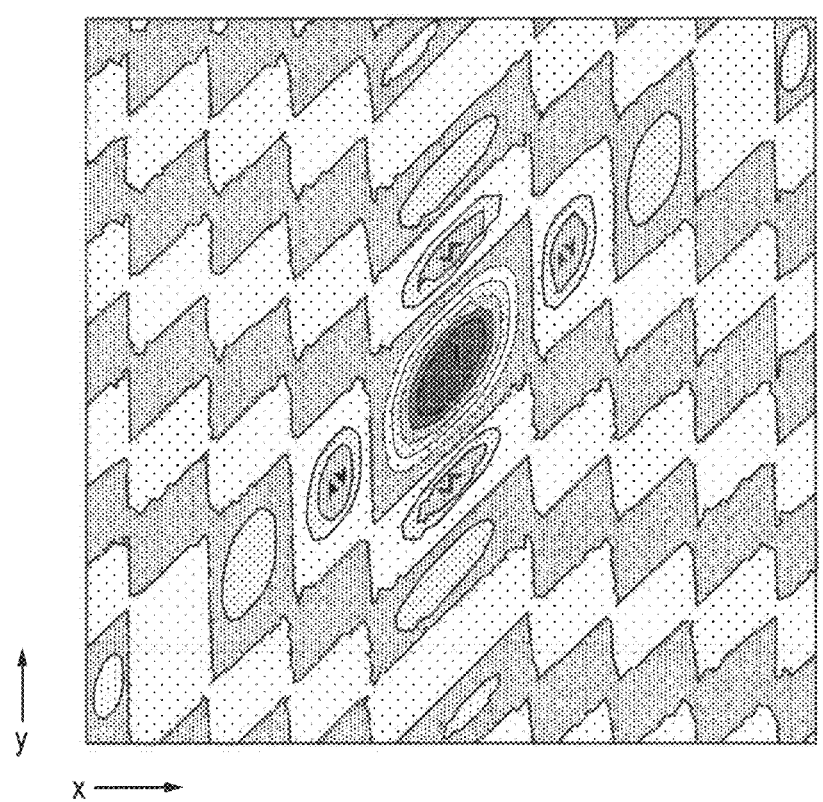

An example of a Sinc filter sheared by 45° is shown schematically in FIGS. 20 and 21, which again follow a shading similar notation to FIGS. 16 and 17 respectively. FIG. 20 is a 3D representation of the rotated filter, and FIG. 21 is an overhead view of the filter. Here the shear transformation has been applied to filter coefficients of the two-dimensional digital filter so as to map the coefficients to different respective positions in the two-dimensional domain, in accordance with the detected image feature direction.

In general, the shear can be considered as a particular type of linear mapping. Its effect leaves fixed all points on one axis and other points are shifted parallel to the axis by a distance proportional to their perpendicular distance from the axis.

A general view of a shearing operation is that coordinates (x, y) in the unsheared data are mapped to coordinates (x', y') in the sheared data, where (x', y')=(x, y+mx). In the example shown schematically in FIGS. 20 and 21, representing a 45° shear, m=1 so that (x, y) maps to (x, x+y).

Shearing of the filter will align the energy of the filter along the edge; this allows for better bandwidth control for the filters when aligning to an edge and will not lead to as many artefacts as those introduced with the rotation method.

An alternative method (to shearing the filter, before the filter is applied to the data to obtain the output pixels) is to shear the data instead and then to apply a digital filter (to the sheared data) to obtain the output pixels. The two methods should produce similar results but the latter method also allows non filter based techniques, such as Bicubic interpolation, to be used on the sheared data. In principle, a shear operation could be applied to both the data and the filter, to give the required amount of shear as a combined effect.

Shearing the data, as described below, can involve filtering groups of input pixels in respect of the first axis, the groups being spaced along the detected image feature direction, so as to generate respective intermediate pixel values; and filtering the intermediate pixel values in respect of the other axis, so as to generate an output pixel.

Sinc Shearing

Figure 22:
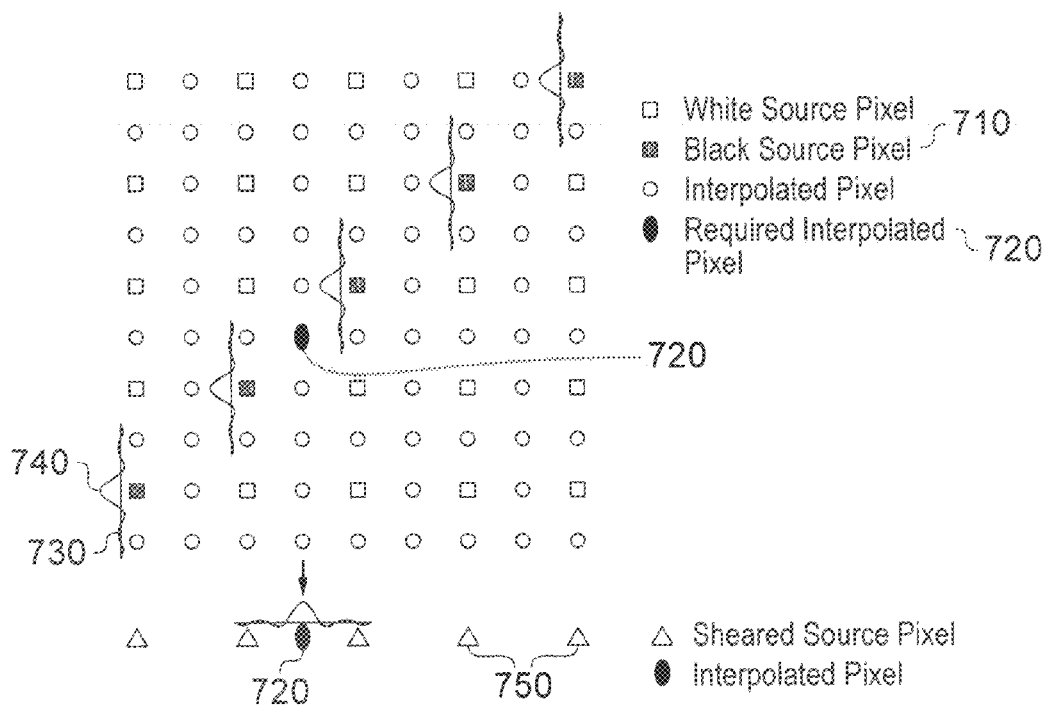
FIGS. 22 and 23 schematically illustrate a data shearing process using Sinc and Bicubic filters respectively.

A Sinc interpolator could be used to shear the data by controlling the phase. For example, FIG. 22 shows a one pixel wide 45° line (formed of the black pixels 710). The oval pixel 720 on the diagram indicates the pixel to be interpolated.

The data can be sheared by filtering the data at various pixel offset positions. A vertical Sinc filter (shown schematically as a curve 730, with the peak 740 of the curve indicating the centre of the filter) is centred on different points (with sub-pixel accuracy) depending on where that particular point lies in relation to the line. The curves 730 shown in the diagram indicate the points at which the filter will be placed. By offsetting the Sinc filter at different positions, the data can essentially be sheared so that a respective sheared source pixel 750 is generated at the horizontal position of each corresponding source pixel on the line. These intermediate sheared pixels 750 can then be interpolated by a horizontal Sinc filter to form the required pixel 720, as shown at the bottom of the diagram in FIG. 22.

Bicubic Shearing

Figure 23:
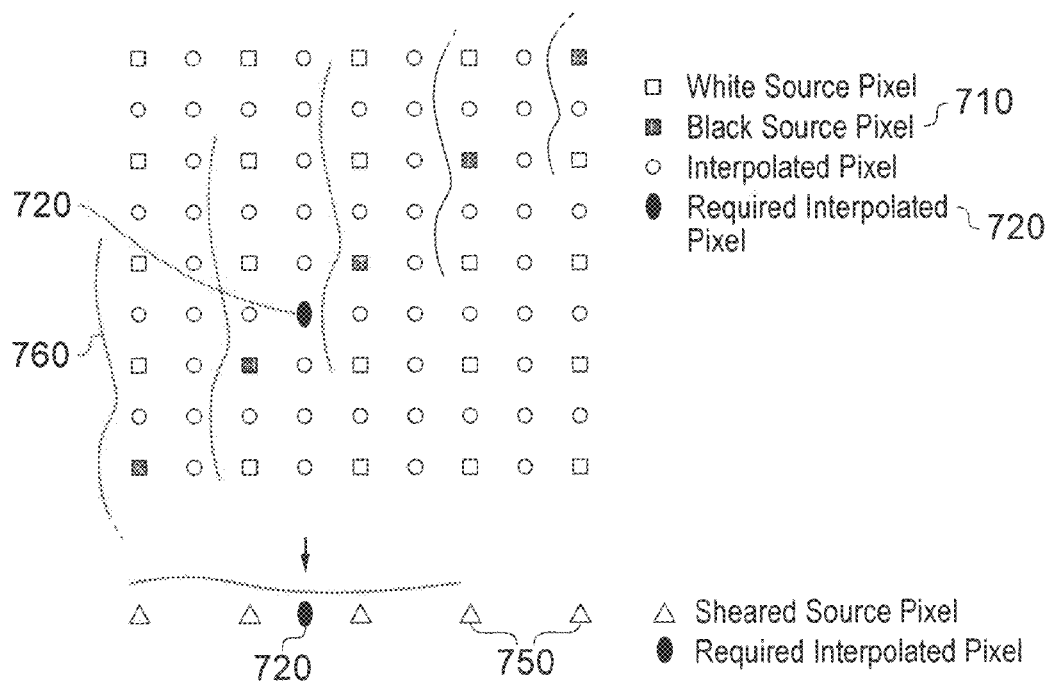

Bicubic interpolation can be used instead of the Sinc filter. This consists of fitting a Bicubic polynomial to a set of the four closest pixels in the direction of the shear, and then fitting a Bicubic polynomial to the four sheared values. This process is represented schematically in FIG. 23, which is very similar to FIG. 22 except that instead of representing a Sinc filter by the curve 730, a Bicubic polynomial is represented schematically by curves 760.

Bicubic Spline Shearing

Instead of using standard bicubic interpolators to perform the shearing, Bicubic Spline interpolators can also be used. This has the benefit of being more continuous across pixel boundaries. As the Bicubic Spline and Bicubic interpolators are very similar, both methods can be implemented in hardware by sharing the resources, with minimal overhead.

Angle of Shearing

In order to shear the data, the angle of the feature needs to be identified. This is found using the angle determination techniques described above.

Figure 24:
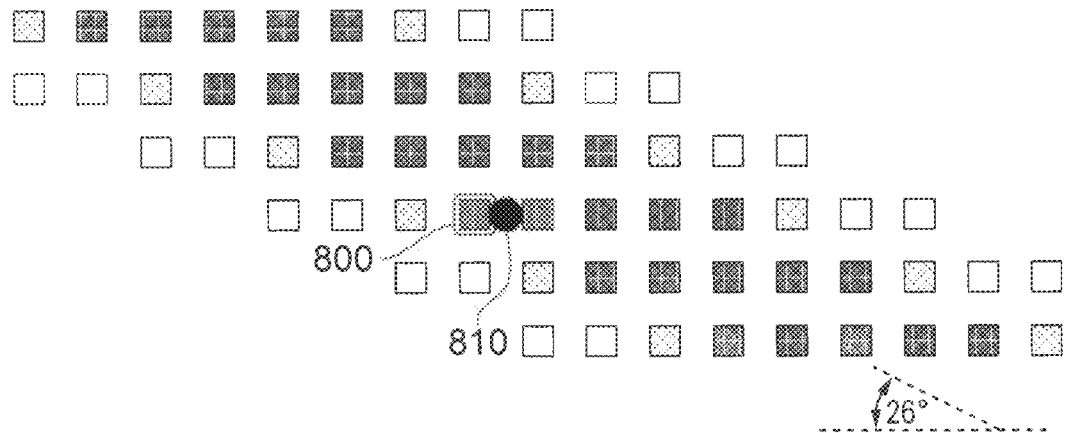
FIGS. 24 to 29 schematically illustrate examples of a data shearing process.

FIG. 24 schematically illustrates a 26° line in a region of an image.

A pixel 800 is the centre source pixel and a circle 810 represents a pixel to be interpolated. In general, the shading applied to the square representations of source pixels represents the pixels' colour or luminance, so that the image feature shown in FIG. 24 is a dark line from upper left to lower right.

In one example, the data is first be sheared in a horizontal direction, so that the line in aligned to the vertical axis. The horizontal shearing process is shown in FIG. 25.

Figure 25:
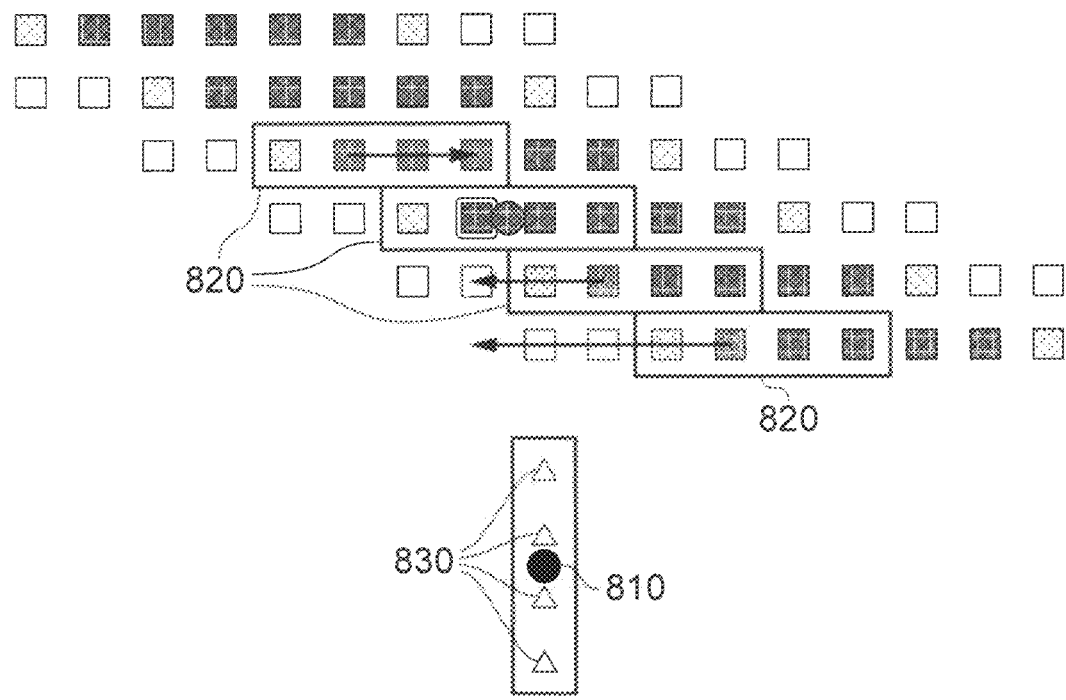

In FIG. 25, the data has been sheared horizontally, so that the pixels in the lines below and above that correspond to the feature are now aligned vertically together. Boxes 820 in the diagram indicate the pixels that would be required to perform the horizontal shearing using Bicubic interpolation, so as to generate respective vertically spaced but horizontally aligned sheared pixels 830. The result of the shearing is shown at the bottom of FIG. 25. The shearing has followed the line so as to find four sheared pixels 830 which can then be used to vertically interpolate the new pixel 810 at the required position.

Figure 26:
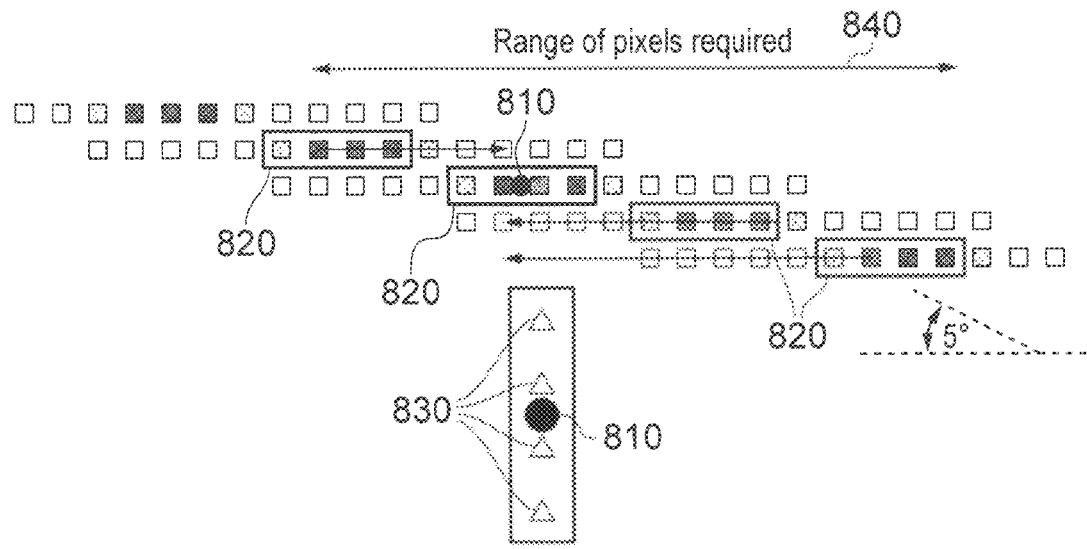

Shearing in the horizontal direction for shallow horizontally aligned lines, produces very good results for continuous long lines, however, for smaller features, shearing in this direction is potentially hazardous and can produce some artefacts. As the angle becomes shallower, more pixels are required to perform the shearing. A range of up to 18 source pixels could be required for lines of approximately 5°. This is demonstrated in the shearing shown in FIG. 26 which follows the same notation as FIG. 25 but represents a line feature at approximately 5° to the horizontal. The horizontal range of pixels required to carry out the horizontal shearing is shown schematically as a range 840. In theory an infinite number of pixels are required as the angle of the line feature approaches the horizontal. This could potentially produce an incorrect result if the image feature was only small in length. A safer approach would therefore be to shear vertically for shallow horizontal lines, as shown schematically in FIG. 27.

Figure 27:
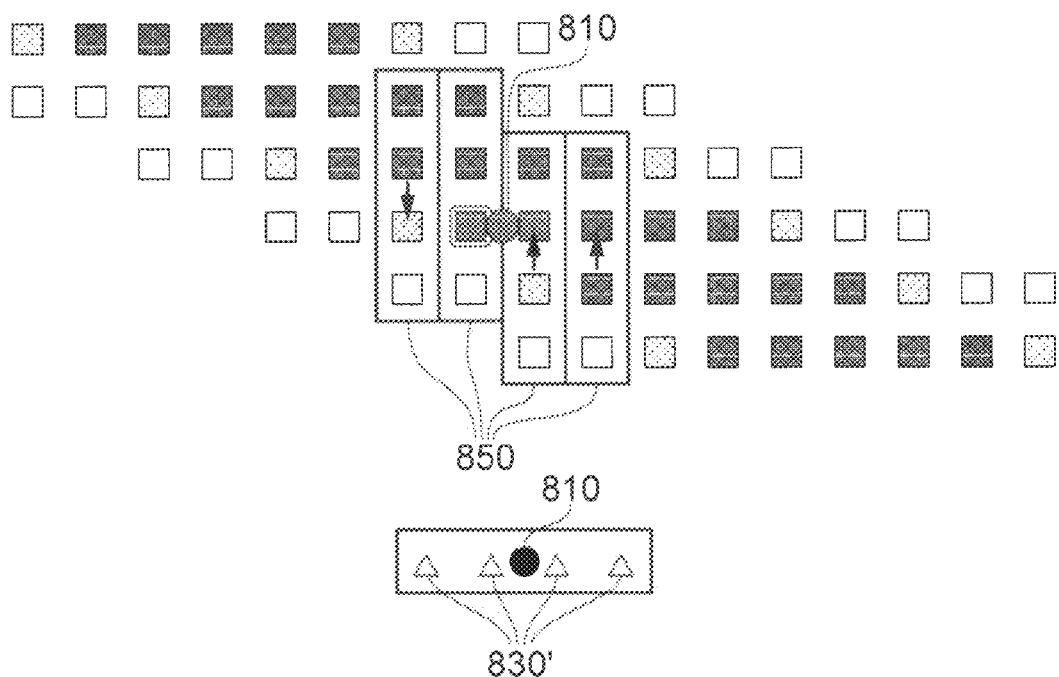

Again, FIG. 27 follows a similar notation to FIG. 25, except that boxes 850 represent the range of pixels needed to carry out the vertical shearing process. The sheared pixels 830' are then interpolated horizontally to generate the required output pixel 810.

Accordingly, the axis used as the one of the axes for which the shear operation is carried out is selected in dependence on the detected image feature direction. In particular, the interpolator 130 is operable to detect which of the two axes is angularly closest to the detected image feature direction, and to select the other of the two axes for the mapping of the filter operation by the shear technique.

Although the sheared pixels are very close to the ideal case of horizontal shearing, shearing in the non-ideal vertical direction can produce some oscillations in the output of the sheared pixels. These oscillations can be selectively filtered away using a smoothing filter, the details of which will be explained below.

Accordingly, for features with angles (from the horizontal) θ found to be between 0 and ±45°, the data is sheared vertically and the angle of shearing is set to the angle determined by the angle determination unit. If the angle is found to be between ±45° to ±90°, the data is sheared in a horizontal direction and the angle of shearing is then set to 90°−θ, for example if the angle indicated by the angle determination stage was 85°, the data would be sheared by 5° in the horizontal direction. The angle required for shearing will be referred to as $\theta_s$. When θ is equal to 45°, an arbitrary choice is made so that the data is sheared vertically with $\theta_s$ equal to 45°.

Shearing the Data

Once $\theta_s$ and the shear direction (horizontal or vertical) have been determined, the data is sheared and then interpolated to find the required output pixel for the required offset. The shearing process is conducted using (for example) a Sinc, Bicubic or Bicubic Spline interpolation, however, for ease of explanation, the Bicubic shearing method will be discussed.

Figure 28:
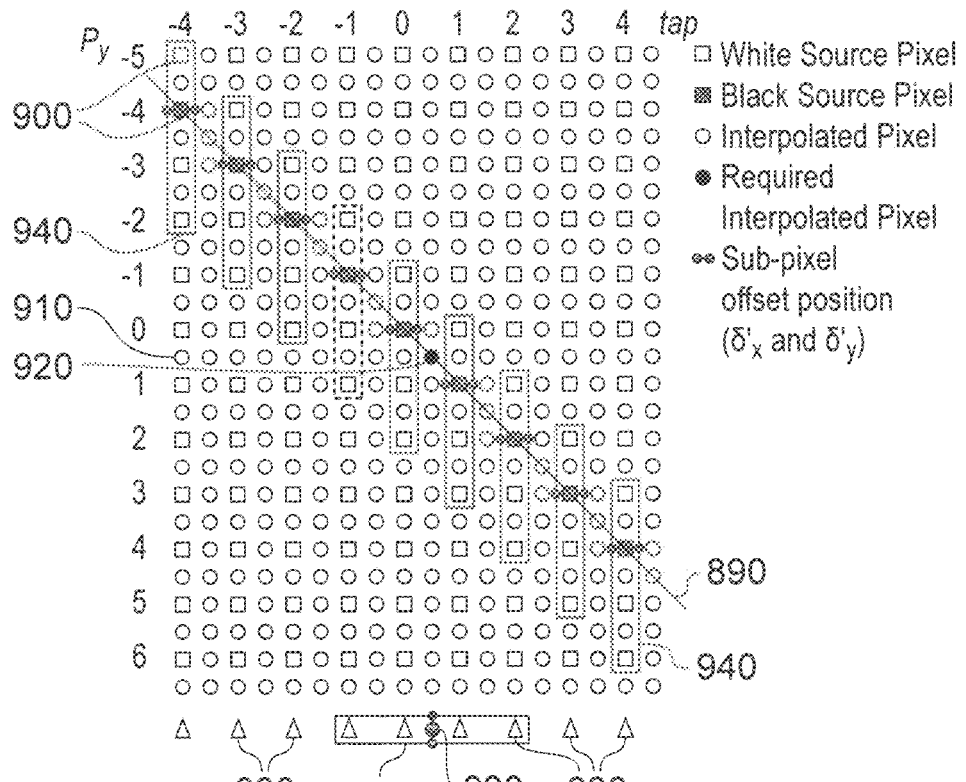

Consider the example of a 45° line 890, as shown in FIG. 28, which is scaled by a factor of 1:2 horizontally and vertically, so that for every source pixel there are four output pixels. Source pixels are shown as squares 900 (black or white depending on the pixel colour), interpolated pixels are shown as white circles 910 in general, but the particular interpolated pixel under consideration is shown as a black circle 920.

This scaling factor means that there are pixels in the output that are aligned to the source data and have a 0 horizontal and 0 vertical sub pixel offset, and there are also other output pixels that correspond to sub pixel offsets of 0.5 horizontal and 0 vertical, 0 horizontal and 0.5 vertical, and 0.5 horizontal and 0.5 vertical.

In this example $\theta_s$ is set to 45° and the shear direction in this case can be either horizontal or vertical; although the arbitrary choice implemented here is to use the vertical direction for this case. The pixel 920 to be interpolated is at offset 0.5 horizontally ($\delta_x$) and offset 0.5 vertically ($\delta_y$). However, it is clear from the diagram that the interpolated pixel lies exactly on the line 890. This leads to the conclusion that in order to interpolate the pixel in question, the vertical offset will also need to be sheared for vertical shearing. The same conclusion can be reached for the horizontal offset for horizontal shearing. In other words, in order to interpolate the pixel in question, the data that is required for filtering is selected by following the image feature direction and finding the vertical intersection points that are aligned to source pixel positions horizontally. These vertical filtering positions are found by applying a vertical shearing to the positions starting from the horizontal axis. A corresponding principle applies for horizontal shearing.

During the shearing process, a total of nine sheared pixels 930 are generated. The amount of shearing is determined from $\theta_s$ and how far the pixel is from the source centre pixel, tap, so that in FIG. 28, a total of nine columns are sheared, producing set of five pixels that are processed by the second stage of the filtering process. Although, for ease of explanation, a total of nine pixels are sheared for the following examples. Each column is sheared by a different amount with the respective offset dependent on the shearing angle $\theta_s$. However, in other embodiments, nominally five points are sheared, a smoothing filter is applied at the values are interpolated to produce the output pixel. Technically only four pixels are required for the shearing process, but five may be used in embodiments of the invention to make the subsequent smoothing filter operation symmetrical.

In order to shear the data, a source pixel offset position, $P_x$ and $P_y$, and a sub pixel offset position $\delta_x$ and $\delta_y$ need to be calculated. These parameters determine the centre of the filter required to perform the shearing at various points along the sheared line, and the sub pixel offset required for the interpolation. The values are calculated using the following equations:

$$shearedPosition = \delta_y + (tap - \delta_x) \times tan(\theta_x)$$

$$P_y = round(shearedPosition)$$

$$P_x = tap$$

$$\delta'_y = shearedPosition - P_y$$

$$\delta'_x = \delta_x$$

For the example above, Py and δ'y for the positions for by δy=0.5 and δx=0.5 become:

| tap | Py | δ'y |
|---|---|---|
| −4 | −4 | 0.0 |
| −3 | −3 | 0.0 |
| −2 | −2 | 0.0 |
| −1 | −1 | 0.0 |
| 0 | 0 | 0.0 |
| 1 | 1 | 0.0 |
| 2 | 2 | 0.0 |
| 3 | 3 | 0.0 |
| 4 | 4 | 0.0 |

The "tap" position is the position of the filter aligned to horizontal source pixels.

This procedure can be followed for any $\theta_s$ and any offset positions to provide new offsets to use during the interpolation. Using the modified offset value and new centre pixel position, the data can be filtered to calculate the required sheared pixel. Sinc interpolation could be used to calculate the required pixel, however, the preferred method is to use a Bicubic polynomial.

The vertical boxes 940 in FIG. 28 show the pixels that will be used for the Bicubic shearing. The central pixel used for the Bicubic interpolation is given by Py and the sub pixel offset position δ'y, is indicated by dots. The Py value calculated above indicates that the pixels used for the polynomial should be offset by 1 pixel. The dots on the enclosure indicate the sub-pixel offset of the required pixel, for the example shown this value is 0. The resulting sheared pixels are shown at the bottom of this figure. Here, note that the interpolation process in use requires four pixels, pm1, p0, p1, and p2. The interpolation process will interpolate a new pixel between p0 and p1 given a sub-pixel offset value. The calculations described above describe the process in which the position of each of the bicubic polynomials is calculated. The Py value described above is the position of each p0 pixel with respect to the origin, and the calculated δ'y is the sub pixel "offset" used in the polynomial fitting. (Px, Py)=(tap, f(tap,δs)).

Once the nine sheared pixels 930 are calculated, the second stage is to interpolate the required pixel from this set of sheared pixels. Again, Sinc or Bicubic interpolation could be used. In the case of the latter, only the central four pixels will be needed, however, all the pixels are still required for the other checks. The pixels required for the second interpolation are again enclosed by a box 950 with the dots indicating the sub pixel offset position (δ'x). This is the horizontal sub-pixel offset position, for this example it is 0.5.

The output from the second stage interpolation process is clipped so that it does not go beyond the maximum or minimum of the pixels that are used for the interpolation.

Figure 29:
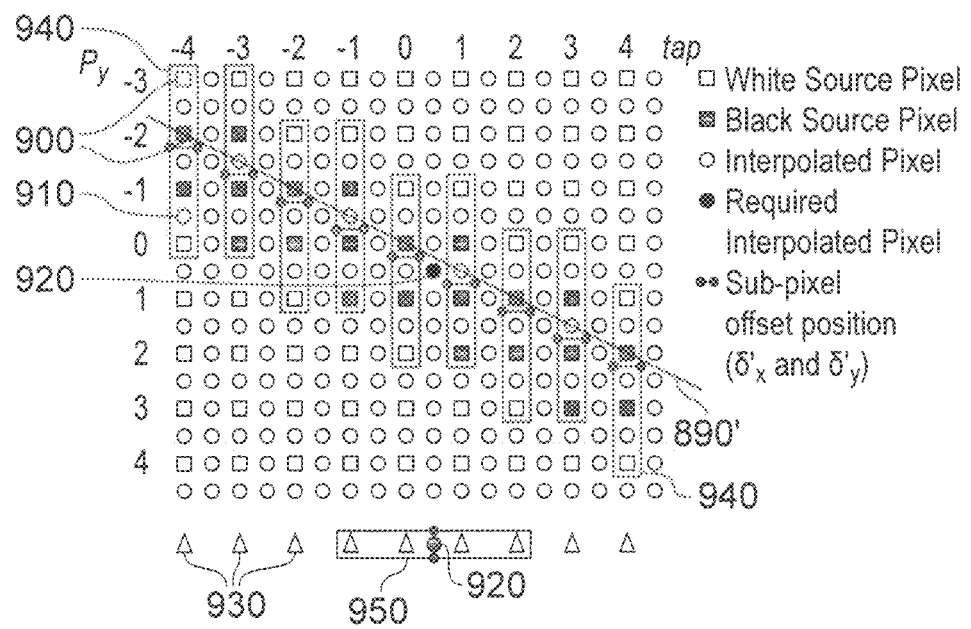

The same procedure can be followed for a 26° line 890', as shown in FIG. 29, which follows the same notation as FIG. 28.

Here, the required interpolated pixel is at sub-pixel offset δx=0.5 and δx=0.5. Using the equation for shearedPosition set out above, the sheared pixel and sub-pixel position Py and δ'y can be calculated. This is shown in the following table.

| tap | $P_y$ | δ'y |
|---|---|---|
| −4 | −2 | 0.25 |
| −3 | −2 | 0.75 |
| −2 | −1 | 0.25 |
| −1 | −1 | 0.75 |
| 0 | 0 | 0.25 |
| 1 | 0 | 0.75 |
| 2 | 1 | 0.25 |
| 3 | 1 | 0.75 |
| 4 | 2 | 0.25 |

It should be noted that for the Bicubic interpolation, the sub-pixel offset ($\delta_y$) should ideally be positive. This is to ensure that the polynomial is evenly balanced. If the sub-pixel offset does go negative, the sub-pixel offset is adjusted so that it is positive and the pixel offset is adjusted accordingly, as follows:

$$if(\delta'_y < 0)$$

$$\delta'_y = \delta'_y + 1, P_y = P_y - 1$$

The procedure described is for applying a vertical shear. The same method can be used for a horizontal shear direction; however, the equations are adjusted as follows:

$$shearedPosition = \delta_x + (tap - \delta_y) \times \tan(\theta_x)$$

$$P_x = round(shearedPosition)$$

$$P_y = tap$$

$$\delta'_x = shearedPosition - P_x$$

$$\delta'_y = \delta_y$$

And the sub-pixel offset adjustment as:

$$if(\delta'_x < 0)$$

$$\delta'_x = \delta'_x + 1, P_x = P_x - 1$$

Angle Interpolation

When performing large zooms (image scaling to make the image larger), for instance ×8 zooms (image scalings with a linear scale factor of 8), one pixel from the source image will provide one angle, which will be used in the interpolation of a block of 64 (8×8) output pixels. An adjacent source pixel will have another angle associated with it, and that angle will be used for an adjacent block of 64 output pixels, and so on. A potential result is that the output image could appear to have a block structure superimposed on it, if these two angles are sufficiently different.

Therefore, embodiments of the invention recognise that in order to ensure smooth transitions between neighbouring output pixels using different angles, it is better if there is a smooth transition between the angles used in interpolation of the output pixels; angle interpolation can be used to help achieve this.

An example of the angles used in a ×4 zoom is shown schematically in FIG. 30. Each block 1000 represents an output pixel, while each shaded block represent the offset position 0 both horizontally and vertically (these are interpolation angles at positions which are aligned to source pixels positions, with zero sub-offset). Using a nearest neighbour method (taking the angle associated with the nearest source pixel to the left and above relative to the required output pixel position) to obtain the interpolation angle, it is clear that there will be a large jump in the angles as the angle switches to the next neighbour, which may produce blocky artefacts in the output image.

A better method of obtaining the interpolation angle is to interpolate the surrounding angles for use in interpolation. The interpolation is conducted in two stages starting from the nearest neighbour values, first horizontally and then vertically (though of course the other order could be used, or the two could be carried out in parallel). FIG. 31 schematically illustrates the output of this angle interpolation technique.

The angle interpolation technique can provide a smooth fading between neighbouring angles, by filtering the detected directions so as to smooth the variation of detected direction between adjacent input or output pixel positions, which is particularly important at high zooms (large scaling factors greater than one). Several checks are conducted in order to avoid producing incorrect angles during the angle interpolation process. Firstly, during each angle interpolation stage, angles are not used if they are deemed uncertain (if certaintyFactor is less than a threshold value); for these cases, the interpolator will return the nearest angle. Secondly, interpolation cannot take place between two angles if the angles are too different, so a programmable threshold is introduced to prevent interpolation if the angle difference is beyond this value. Again, if this condition should arise, the angle interpolator will return the nearest neighbour as the result of each interpolation stage.

Filter Blend Value Generation

As illustrated in FIG. 27 described above, due to the non-ideal shearing direction, oscillations can appear in the sheared pixels. These are removed using a combination of filters.

Due to the smoothing process involved, some fine detail could be smoothed or even removed if a confident angle has been found during the angle finding stage. In order to prevent this excessive smoothing, the consistency of the chosen template is examined to ensure that the pixels in the template conform to certain requirements. A filter blend value is assigned to each pixel to indicate how much filtering should be permitted during the interpolation stage. If indicated by the checks, the filter will be disabled during the interpolation process, with the aim of preserving the finer detail.

This check can be conducted on all GBR channels, a single green channel, or the hybrid greyscale channel, depending on the current configuration.

Figure 32:
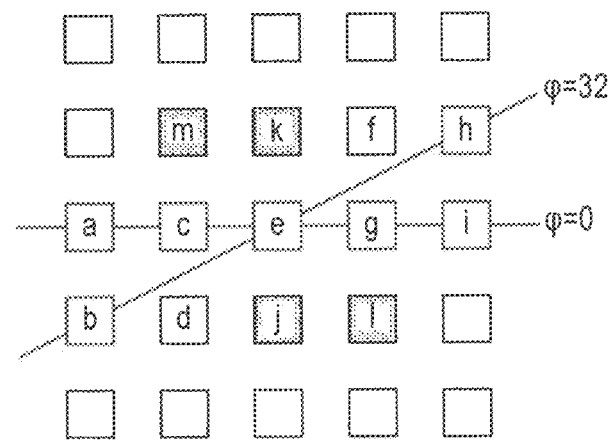
FIG. 32 schematically illustrates a filter blend value generation process.

Four additional pixels are required in order to perform these extra checks, j, k, l, and m, these are shown in FIG. 32 for the template of FIG. 6a. The positions of j, k, l, and m are in similar suitable positions for the other templates.

In order for the angle found to be considered consistent, the pixels surrounding the detected line should diverge towards or away from the line. If this is not observed, the feature should not be smoothed during the interpolation process.

This divergence can be measured in the form of a monotonicity calculation. The bottom half of the template, pixels b, d, j and l, are tested separately from the top half of the template, pixels m, k, f, and h.

For the top half to be considered good, either pixels m, k, f or pixels k, f, h must be monotonic. In general, for a good top half:

$$m \geq k \geq f | k \geq f \geq h | m \leq k \leq f | k \leq f \leq h$$

In addition to the pixels being tested for monotonicity, the degree of linearity is also tested, and the pixels under test must differ by linear amounts. This is tested by evaluating the difference of the two outer pixels in each test with the centre pixel, ensuring that this difference is sufficiently low. For example, when testing pixels m, k and f, the absolute difference between m and k must be with a given tolerance of the difference between k and f.

$$abs(abs(m-k) - abs(k-f)) \leq linearTolerance$$

where:

$$linearTolerance = Max(abs(c-e), abs(g-e)) * linearFactor$$

where linearFactor is a programmable value. This test is repeated for each of the monotonicity checks above. However, if the above tests fail, then another set of tests may be applied. The application of the other tests is dependent on whether certain pixels are within a certain tolerance of each other. The tolerance is defined as:

$$tolerance = Max(abs(k-e), abs(j-e))/factor$$

where factor is a programmable parameter.

The test is as follows:

$$e \geq f \geq k | e \leq f \leq k \text{ when } |m-k| \leq tolerance$$

$$e \geq h \geq f | e \leq h \leq f \text{ when } |k-f| \leq tolerance$$

$$e \geq k \geq m | e \leq k \leq m \text{ when } |f-h| \leq tolerance$$

If any of the relevant equations is true, then the respective 'half' is deemed to be good. However, this decision may subsequently be overruled, depending on the monotonicity of the central pixels. If the monotonicity value of the central three pixels is greater than a permitted value, the top half is deemed bad:

mono=abs(abs(c−e)+abs(e−g)−abs(c−g))

energyac=abs(a−c)*energyFactor if(mono>energyac)

Top half is bad where energyFactor is a programmable threshold.

Similar tests are processed for the bottom half of the template involving pixels l, j, d and b.

Once the results for the top half of the template and the bottom half have been determined, the filter blend value can be determined. If both the top half and the bottom half are deemed bad, then this pixel should not be filtered, therefore the filter blend value is set to 0. If both the top half and the bottom half are deemed good, then this pixel should be filtered, the filter blend value is set to the maximum value (for example 1, or 255, depending on the implementation).

If only one of the top or bottom half tests has returned 'good', an additional test is required to ensure that the half which returned 'good' is suitable. This test ensures that there is sufficient energy in the side that has been deemed 'good'. If this energy is not above a programmable threshold, the half cannot be deemed good. The energy of the side is measured by summing the differences between adjacent pixels and testing whether this is above a programmable threshold:

energyHalf=abs(m−k)+abs(k−f)+abs(f−h)

if(energyHalf<energyThreshold)

Tophalf is 'bad'

If only one half is deemed good, the filter blend value can be set to the maximum value only when the standard deviation of the best template is sufficiently smaller then the standard deviation of the perpendicular template. This test will indicate how good the detected line is, as the energy across a feature should be very much larger then the energy along a feature.

As described earlier, the perpendicular template is given as the template which is four templates away from the best template, so that if the best template was found to be the template of FIG. 6a, the perpendicular template would be the template of FIG. 6e, and so on.

If the standard deviation value of the best template is given by minSD, and the perpendicular template standard deviation is given by perpSD, the filter blend value can be set to the maximum value if:

if(minSD*sdfactor<tangSD&& tangSD>perpThreshold&&

(topHalfIsGood|bottomHalfIsGood))

filterBlendValue=max where sdFactor and perpThreshold are programmable parameters. This test can be repeated a number of times, with different values of factor and threshold. Currently three tests of this kind are processed with different parameters.

Once the filter blend values have been produced, they are passed to the interpolator so that they can be used during the filtering stage.

Smoothing the Sheared Data

In embodiments of the invention, the pixels produced by the shearing are filtered to reduce any possible oscillations.

In order to aim to preserve any high frequency information present in the sheared data, it is important that the correct amount of filtering is applied. For example, at interpolation angles of 0° and 45°, the shearing process is ideal, and no oscillations are added during the interpolation process. However, the interpolation angle 26° has the possibility of introducing the greatest quantity of high frequency oscillations. The frequency of the possible oscillations is dependent upon the shearing angle, so in order to avoid removing the wanted frequencies, the filtering process can be controlled using the shearing angle, or more specifically, the tan of the angle.

In embodiments of the invention a 5 tap filter is used to perform the filtering on each GBR colour channel of the output data.

No filtering should be applied at low angles (around 0°) or at higher angles (around 45°), and so the required filter to be applied is [0 0 1 0 0], or in other words a simple impulse response.

For angles around approximately 26°, the oscillations are at a higher frequency, therefore a low-pass filter is used to help remove them, whose coefficients are [1 4 6 4 1]/16.

For intermediate angles, for example, around 5° or 40°, the oscillations will occur at the mid frequencies. Therefore, in order to help remove these oscillations a mid-pass filter is used. The filter coefficients are [4 0 8 0 4]/16.

The three filters produce good responses for the specific angles mentioned above, but for a more general approach it is useful to combine them so that responses appropriate to other angles can be produced. One way of achieving this is to filter pixel data using all three filters and the three results are blended dependent on the shearing angle, according to the following equation:

$$result = sourceBlend(\varphi) \times [0\ 0\ 1\ 0\ 0] * source +$$
$$mpfBlend(\varphi) \times \frac{1}{16}[4\ 0\ 8\ 0\ 4] * source +$$
$$lpfBlend(\varphi) \times \frac{1}{16}[1\ 4\ 6\ 4\ 1] * source$$

where source represents the sheared pixel values, and the functions sourceBlend(φ), mpfBlend(φ) and lpfBlend(φ) blend the three different filters by various amounts to give a combined frequency response that behaves as required. These mappings can all be made programmable. Note that the mappings are symmetrical around $\tan(\theta_s)=0.5$.

In addition to controlling the amount of filtering dependent on the angle, the output is also controlled dependent on the template consistency checks conducted during the angle finding stage, as explained above. The equation given above can be modified (as shown below) to include the value of the filter blend value. When the filter blend value is set to zero, the effect of the filter should be disabled, and the source pixels should be output, so that z=0. When the filter blend is set to the maximum value(1), the filter is at full effect. The effect of the filter is gradually faded in as the filter blend value increases from 0 to 1.

In addition to controlling the amount of filtering dependent on the shearing angle, the filtering can also be controlled dependent on the picture size.

During a 1:1 zoom, it is important that the output image is the same as the image produced during a 1:1 shrink, to ensure a smooth transition from the shrinking scalar to the zooming scalar.

Therefore, the effect of this filter should be reduced as the scaling ratio tends to 1:1, and be fully enabled as the scaling ratio tends towards 2:3 (and beyond). Considering this, the above equation can be adjusted to incorporate this adjustment:

$$result = (z \times sourceBlend(\varphi) + (1-z)) \times [0\ 0\ 1\ 0\ 0] * source +$$
$$z \times mpfBlend(\varphi) \times \frac{1}{16}[4\ 0\ 8\ 0\ 4] * source +$$
$$z \times lpfBlend(\varphi) \times \frac{1}{16}[1\ 4\ 6\ 4\ 1] * source)$$

where z is set to 0 when the scaling ratio is set to 1:1 and linearly faded up to 1, as the scaling ratio increases to 2:3 (and beyond).

Once the results have been filtered to remove any oscillations, the final bicubic (or, in embodiments of the invention, sinc, bicubic spline or polynomial) interpolation can take place to generate the final output pixel.

Non Shearing Interpolation Method

When the sheared interpolated pixel cannot be used reliably due to a low certaintyFactor value, the output interpolated value is replaced or mixed with a pixel created using a non edge-directed, non sheared interpolation method, referred to as the default interpolation method.

Sinc interpolation is a candidate for the default interpolation method when such a case arises. However, due to the large luminance differences observed empirically between Bicubic interpolation and Sinc interpolation, matching of the two interpolation methods to provide smooth transitions between sheared and non sheared areas can be difficult. Considering this, standard Bicubic interpolation is instead used as the non shearing algorithm in embodiments of the present invention. The Bicubic interpolation process also has the added benefit of generally not producing ringing artefacts, such as those commonly seen during Sinc interpolation. The Bicubic interpolation is also significantly smaller, in terms of hardware or other processing requirements.

As the Bicubic Spline implementation is very similar to the standard Bicubic interpolation method, a choice of interpolators can be provided if desired. The Spline implementation has the added benefit of being more continuous across pixel boundaries.

Boundary Smoothing

In order to avoid harsh edges between shear-interpolated and non shear-interpolated regions, the certainty values certaintyFactor are themselves interpolated to produce smooth transitions between these zones. However, smooth transitions of the mixer control value may not be sufficient to avoid noticeable artefacts due to the different interpolation techniques used. For example, consider scaling an example image for which, in a central region, the pixel data is aliased and therefore the angle cannot be determined as it is not possible to predict the correct direction for these pixels. The interpolation process should revert back to using the orthogonal non-shearing scaling methods. If the angles involved either side of the aliased region are those that create the most oscillations during the shearing process, they are therefore smoothed the most. But due to this smoothing, there is the potential for a brightness difference in the output image between the standard bicubic result and the sheared result.

In order to avoid this brightness difference, the standard bicubic result is smoothed adaptively around these boundary areas to avoid this artefact and provide a more pleasing transition.

In order to match the brightness levels, the non-sheared input data is smoothed during the interpolation process and the smoothing is conducted on pixels only on boundary areas. Non-sheared pixels that are sufficiently far away from sheared pixels should not be filtered, this is to preserve image quality in the non sheared zones. Pixels should also be filtered according to how much the sheared pixels in the region have been filtered, for example, if the sheared pixel was at 45°, no filtering should be applied for the non sheared pixel, as the sheared pixel would not have undergone any filtering. A 3×3 neighbourhood of certainty values is used to decide whether any smoothing is required.

To calculate the amount of filtering required, the largest difference between the current output pixel and its eight neighbouring source pixels must be found. To help avoid artefacts, no hard switching is used between pixels that have been filtered and those that have not. Therefore, the difference in certainty values must also be modulated by the distance between the output pixel and the source certainty value. In general, $$gradient = \frac{\Delta certaintyValues \times (maxDistance^2 - distance^2)}{maxDistance^2}$$

where maxDistance is the largest possible distance between an output pixel and a neighbouring pixel, independent of zoom factor (this is fixed at 2√2 source pixels). As previously stated, the data should not be smoothed if the sheared data was not smoothed. Therefore, the gradient should also be modulated using the shearing angle. The smoothing should be disabled for shearing angles of tan(0°) and tan(45°) and be unadjusted for a shearing angle of tan(26°) and linearly vary between these angles.

$$gradient' = gradient * adjustmentFactor$$

where gradient' is used to determine how much smoothing is required for the source data during the interpolation process.

The data can be smoothed horizontally or vertically, where the choice of direction of smoothing is dependent upon the shearing angle: for angles of 90°, the data should be smoothed in a vertical direction, and for angles of 0°, the data should be smoothed in the horizontal direction. The amount of smoothing required is then linearly blended between these angles. The gradient' calculated indicates the amount of blending required between the pixel filtered using a low-pass filter and the source pixel. To save hardware resources, only the central two columns are filtered during the vertical filtering process.

Mixer Operation

Once the sheared and non-sheared interpolated results have been created, a method of mixing the two results is required. The nearest neighbour (the nearest source pixel to that output pixel position) certaintyFactor could simply be used to provide a mixing value; however this is not desirable for large zooming factors.

For example, a scaling ratio of ×4, a single source pixel will provide an interpolation angle and certaintyFactor for 16 output pixels, arranged in a 4×4 block. If there are neighbouring pixels that have chosen a slightly different interpolation angle, or have a different certainty, the output may look blocky. In order to avoid this, the certaintyFactor and angle values are used to interpolate a mixer control value for each output pixel, based on its sub-pixel position and neighbouring certaintyFactors.

Interpolation of the Certainty Values

Figure 33:
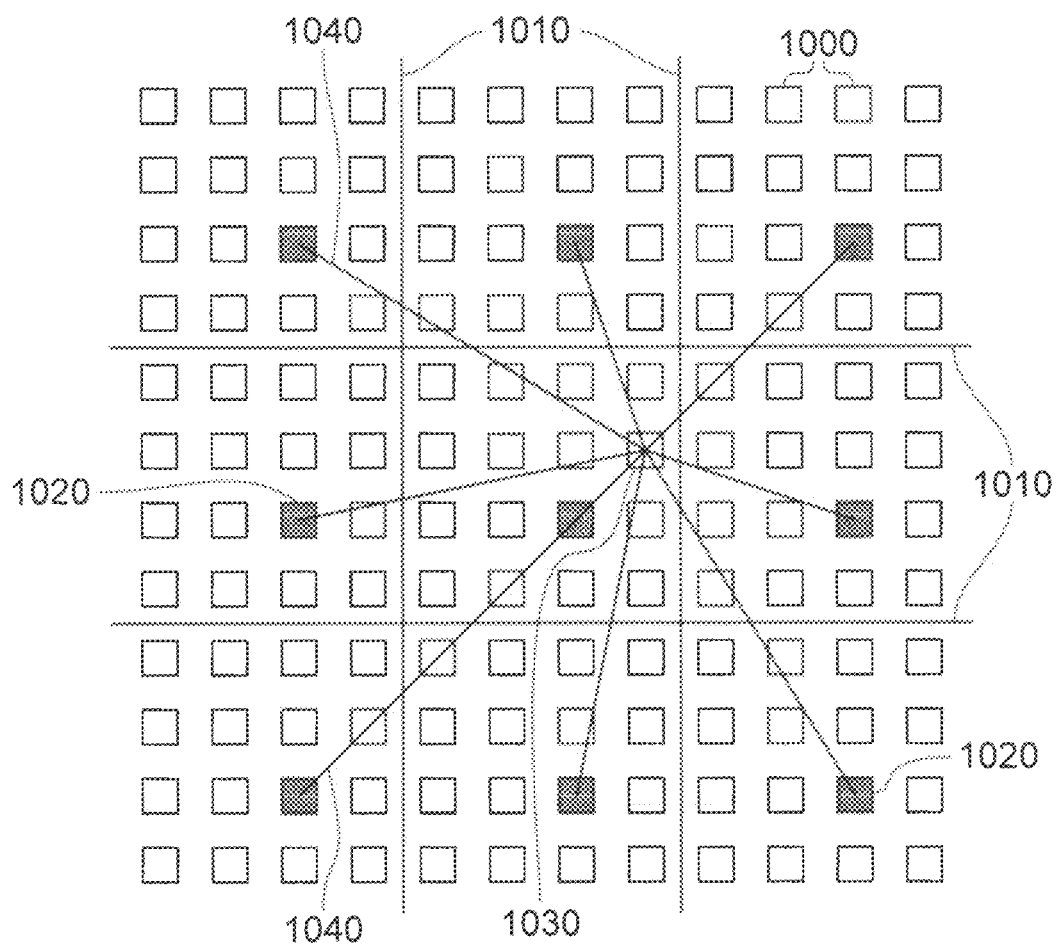
FIG. 33 schematically illustrates the interpolation of certainty values.

In order to interpolate the mixer control values, the certaintyFactors and interpolation angles in the 3×3 pixel neighbourhood are required. Consider the example shown in FIG. 33. The image is scaled by a factor of 4 so that 16 output pixels correspond to a single source pixel. Output pixels are drawn as squares 1000, with a grid 1010 generally indicating the spacing of source pixels relative to the output pixels.

Black pixels 1020 in the figure represent those pixels at offset positions of 0 both horizontally and vertically (output pixels aligned with source pixel positions), while a pixel 1030 is the pixel for which the mixer control value is currently being calculated.

In order to ensure a smooth transition between neighbouring pixels with different certaintyFactors or angles, a check is conducted to ensure that there is a gradual fade between values. This is produced by ensuring a minimum gradient between neighbouring certainty values.

The squares of the distances of the current output pixel 1030 from each of the neighbouring nine pixels 1020 positioned at offset 0 position are found. These distances are indicated by lines 1040 in FIG. 33. These distances are used to determine the maximum certaintyFactor that the output pixel can have dependent on the neighbouring pixels' certaintyFactor. For each neighbour, the following permitted output certaintyFactor is determined:

distance=Min(distance−0.5,0)

maxCertVal=distance*certaintyGradient+neighbourVal outputCertainty=Min(maxCertVal,currentCertainty)

A value of 0.5 is subtracted from each distance value, in order to maintain the current pixel's certaintyFactor over a particular area to ensure smooth blending. The certaintyGradient is a programmable variable, which controls the amount of fading permitted between neighbouring certaintyFactors. This method will provide smooth transitions between neighbours with different certaintyFactor values.

The equations above could (in other embodiments) be further adapted to incorporate the angle difference between neighbouring pixels. Consider the example where the neighbouring 3×3 neighbourhood had very similar certainty values, but their angle were significantly different. These areas will all be sheared by different amount, causing a mismatch at the pixel boundaries. To prevent this from happening, the angle difference between neighbouring pixels is incorporated into the equations to penalise the output certainty value further. This is achieved by adjusting the distance value and maxCertVal, by the difference in the angles.

distance=Min(distance−0.5−angleDiff0)

maxCertVal=distance*certaintyGradient+neighbourVal−angleDiff outputCertainty=Min(maxCertVal,currentCertainty)

Once each neighbour has been tested individually, the minimum outputCertainty value from each of the tests is used form the set the output mixer control value, this is then passed to the mixer 170 for the final mixing.

Interpolation of the Filter Blend Values

In order to avoid blocky artefacts during the interpolation process, the filter blend values produced during the angle finding stages can also be interpolated to the output image size. The process for interpolating the filter blend values corresponds to the process described for interpolation of the mixer control values.

Mixer Operation

The output is formed by the mixer 170 from a blend of the pixel derived from the non-shearing interpolation, with that from the shearing interpolation, depending on the value of the mixer control value generated by the controller 160, on a per pixel basis. This is summarised by the following equation:

output=mixercontrolvalue×shearResult+(1−mixercontrolvalue)×nonShearResult

The resulting value is the interpolated output.

Filtering the Output Picture

If traditional methods of filtering to produce a smoothed or sharpened picture were used, the image would be filtered after the interpolation process has been completed. Therefore, in order to effectively filter an image that has been zoomed by a scaling factor of n, a filter of at least 2n+1 taps is required. For example, an image that has been scaled up by a factor of 4, requires at least a 9 tap filter to encompass enough source data. This significantly increases the number of line buffers required for vertical filtering. Therefore an alternative, more efficient method is considered here.

Techniques will therefore now be described for processing the output picture to produce a filtered result without necessarily requiring surrounding output data.

Figure 34:
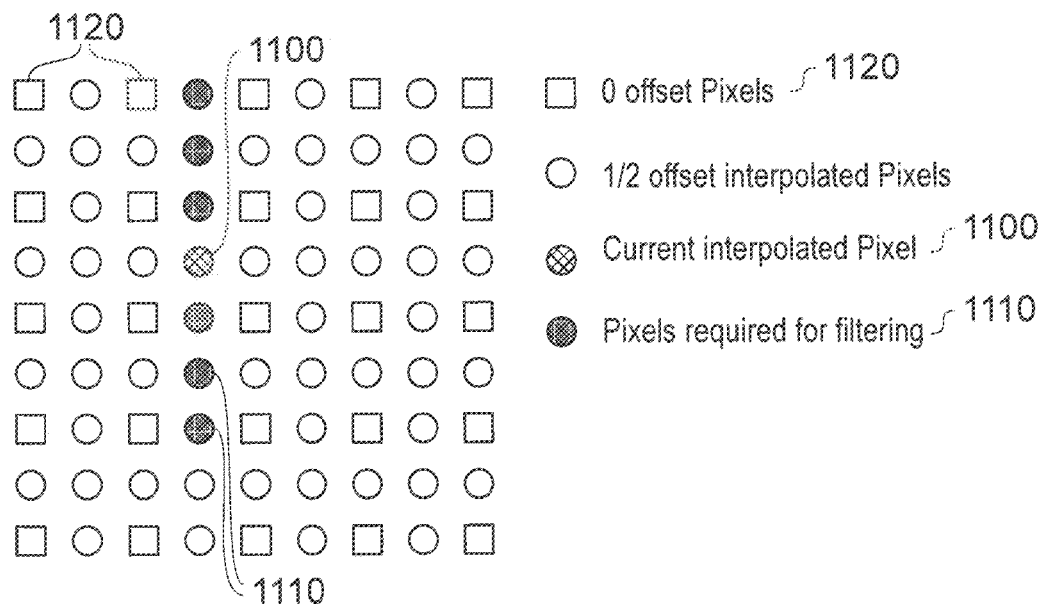
FIG. 34 schematically illustrates a pixel estimation process.

A technique for vertical filtering by estimating output pixels will now be described. Consider the example below in FIG. 34 for a ×2 zoom. A circle 1100 represents the current output pixel. For vertical filtering, the output pixels 1110 are required. To obtain these pixels could incur several line delays to ensure enough data is available.

Therefore, rather then using actual output pixel during the filtering stage, the output pixels could instead be estimated using the source data (square pixels 1120). For example, the pixels 1110 can all be interpolated (for the purposes of this process) using bilinear interpolation. The filtering operation can then be performed with no additional line delays on the output data, assuming the filtering process has the source data available.

In order to aim to preserve an edge that has been interpolated using the shearing method, it can be beneficial if the data could be filtered in a direction perpendicular to the line. This is explained in the following section.

Perpendicular Filtering

Figure 35:
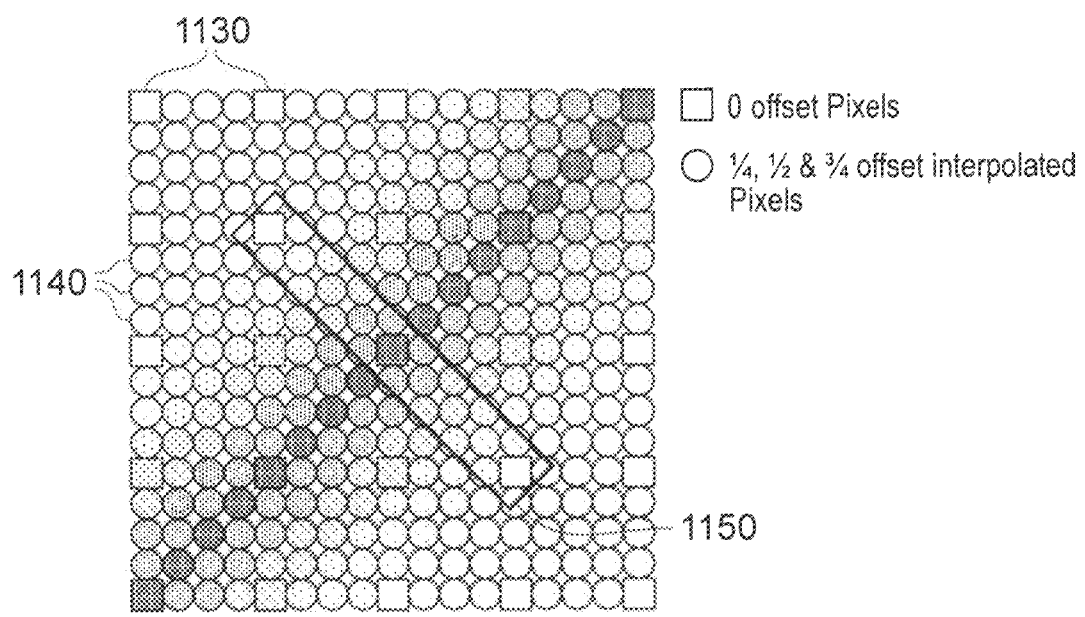
FIG. 35 schematically illustrates a perpendicular filtering process.

Consider the example of a −45° line (lower left to upper right) that has been interpolated using the shearing interpolator, as shown schematically in FIG. 35. Output pixels at zero offset (those which correspond in position to source pixels) are shown as squares 1130, whereas output pixels at intermediate positions are shown as circles 1140. The shading of each pixel generally indicates its colour and/or luminance, so that a diagonal line feature may be seen.

In order to aim to preserve the edge of this feature, during the filtering process, the line is filtered perpendicular to its direction, as indicated by a rectangle 1150. The output pixels can be buffered so that they are available for the filtering stage.

As with the previous example, the additional line delays on the output can be removed from the filtering stage if the required pixels can be approximated using the original source pixels. However, this would produce pixel data that was not true to the original feature, by reintroducing jagged edges, so a better approach would be interpolate the pixels required for this post-filtering process using a shearing method.

Figure 36:
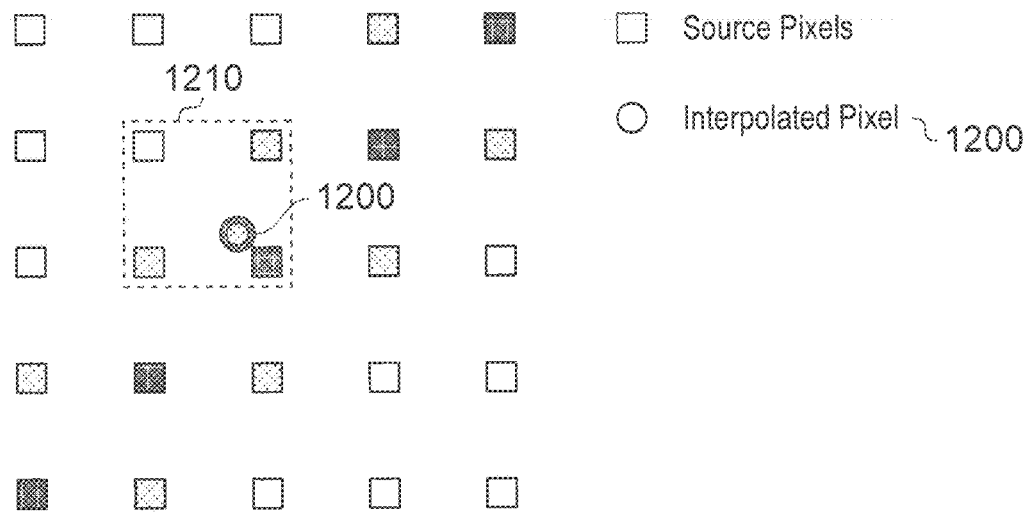
FIGS. 36 and 37 schematically illustrate the estimation of pixel values for filtering.

A circle 1200 in FIG. 36 indicates a pixel that is required for such a filtering operation. Using standard bilinear interpolation, this pixel can be calculated using the four surrounding source pixels (whose luminance is indicated by their shading), as highlighted by the dashed box 1210. In this example, this pixel is calculated as 71% grey.

Figure 37:
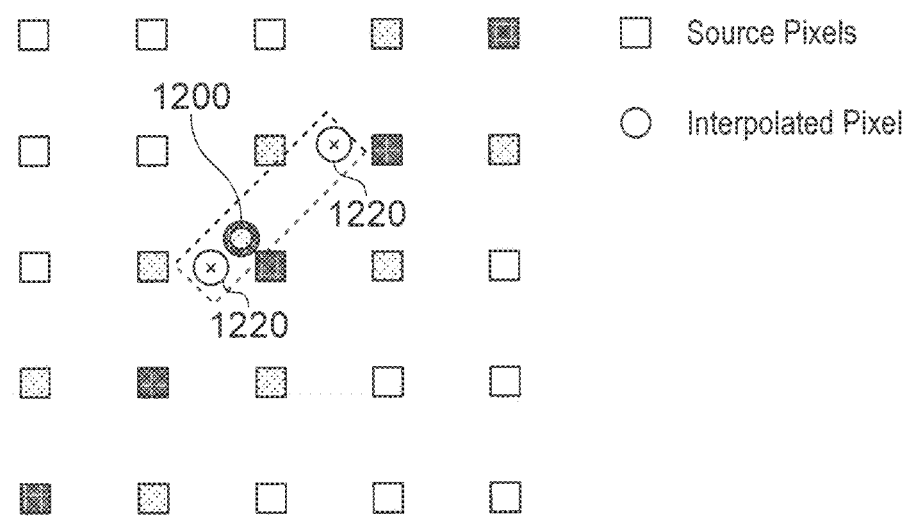

However, it is clear that this pixel is following the −45° line, and therefore that its value should actually be interpolated using the two diagonal pixels 1220, as shown in FIG. 37. The interpolation between the pixels 1220 is carried out using the shearing method as described above. This approach would produce a pixel at 75% grey, a value that is truer to the feature. Interpolation of the other pixels required for the filtering stage can be found in a similar manner. In this way the data can be filtered as required.

Figure 38:
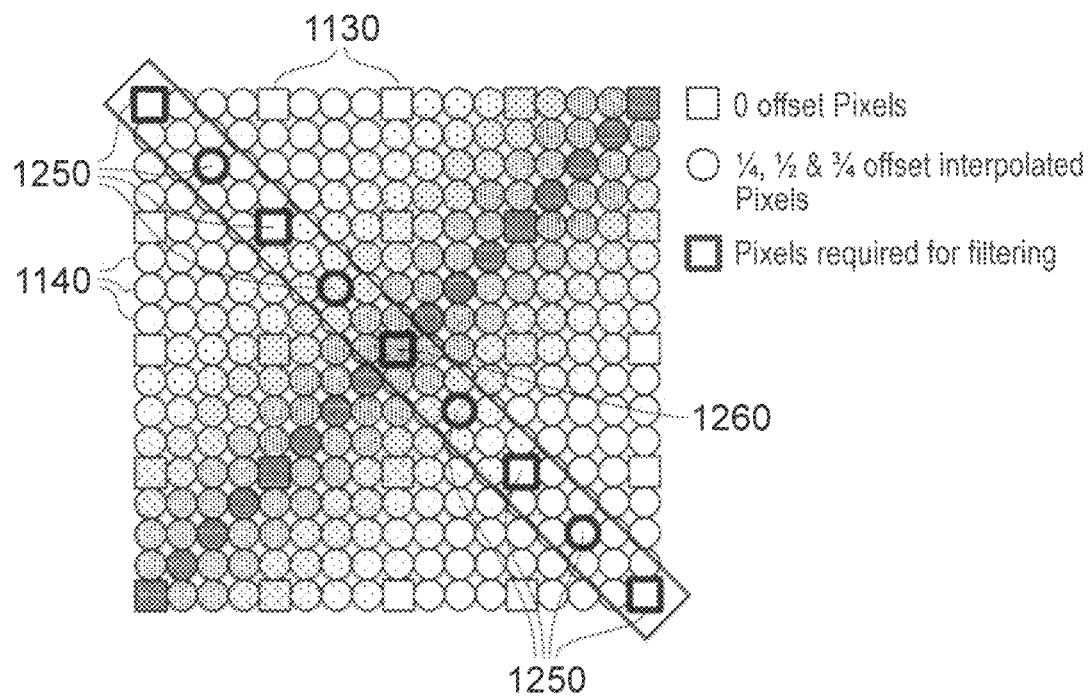
FIGS. 38 and 39 schematically illustrate a perpendicular filtering process.

As the zoom factor increases, the ability of a fixed sized filter to sharpen of soften an image is reduced. In order to compensate for this, rather then sampling a pixel at an output pixel position, each pixel can be sampled at a ½ source pixel position. Each pixel is interpolated using a shearing process. As with the interpolation methods described earlier, the data is sheared with fixed interval periods. During the shearing process, sampling at ½ pixel intervals will result in sample points being more then ½ a pixel apart (See FIG. 38), it order to fix the size the sample intervals are adjusted during the interpolation process in order to maintain the ½ pixel interval (fixed) for the interpolated pixels. The shearing interval periods are trigonometric functions of the shearing angle. An example of this is shown in FIG. 38, which schematically illustrates an image being zoomed by a factor of 4. As in FIG. 35, output pixels which align with source pixel positions are shown as circles. Pixels 1250 which are required for the filtering stage in respect of a pixel 1260 are also indicated. Using this method, the filter will be effective at any zoom ratio, and the size of the filter can be fixed. Nominally, a seven tap filter is used in this example.

Figure 39:
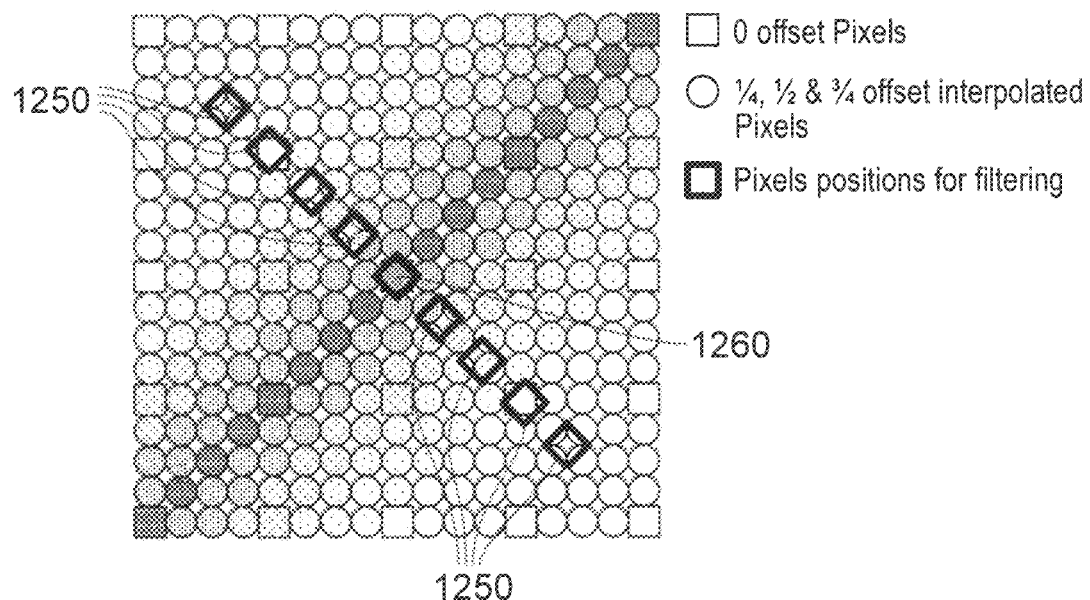

In the above example, as mentioned, although the sample points are a ½ source pixel distance both horizontally and vertically, the exact distance between each sample point is actually larger then ½ a source pixel. To enable all angles to have the same frequency response, the sampling distance is therefore adjusted so as to equalise the sampling distance, as shown in FIG. 39. The distance compensation factor is a function of the sine/cosine of the angle.

Clipping Processing

During the filtering process, the result may be allowed to over or under shoot. The amount of this over or under shoot is determined by examining the filters used during the filtering process. The output value is limited to be no bigger then a multiple of the difference between the maximum (max) and minimum (min) pixels used during the filtering:

shootAmount=(maxPel−minPel)*factor

*if*(output>max+shootAmount)

output=max+shootAmount

*if*(output<min−shootAmount)

output=min−shootAmount

Each of these tests can be disabled independently.

Mixing the Filtered Results

Perpendicular filtering can only be used in cases where the angle has been found with a high level of certainty. Therefore, two results need to be calculated: one result using perpendicular filtering and another result formed from a vertical form of the perpendicular filter followed by a horizontal filter formed as a horizontal form of the perpendicular filter (as a traditional filter could suffer from the same problems as described above). These filtered images are then linearly mixed using the same mixer control values as those produced when combining the shearing interpolated data and the non-shearing interpolated data.

Filtering Techniques

In many instances of the filtering processes described above, multi-tap filters are applied to input pixels to generate output pixels. In practical implementations, this is generally carried out in a scanning manner, so that the filter is applied at each input pixel position in turn. However, if an output pixel at a particular pixel position is not required, the filter arrangement is either inactive or its result is discarded, either of which implies a potential waste of processing resources.

Figure 40:
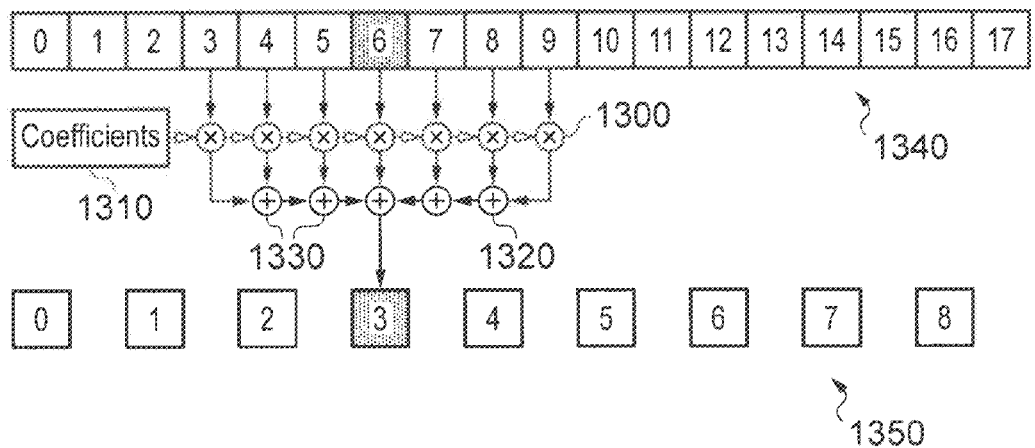
FIGS. 40 to 41 schematically illustrate a previously proposed filtering arrangement.
Figure 41:
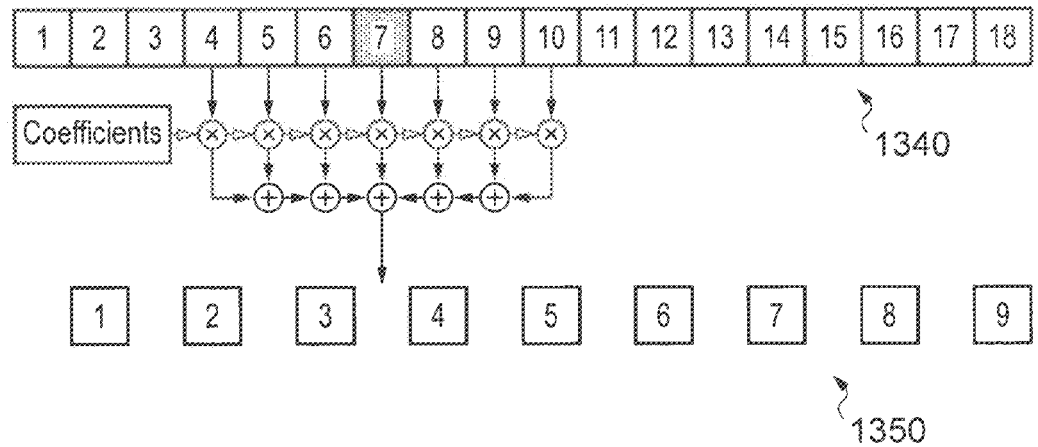

A particular instance of this is in the situation where a scaling factor of less than one is being used in the image scaling systems described above. An example arrangement illustrating this is shown in FIGS. 40 and 41.

In these figures, a seven tap filter is formed of seven multipliers 1300 each supplied with a respective coefficient by a coefficient store 1310, and a summation unit 1320 comprising a series of adders 1330 for summing the outputs of the multipliers 1300.

In operation, the multipliers each receive a respective coefficient and multiply a respective pixel value by that coefficient.

The source pixel values (or the input pixel values to the filtering process shown in the figure) are drawn as a line of blocks 1340, numbered (for the sake of this example) from 0 to 17. The blocks 1340 represent part of a line of pixels in an image comprising multiple such lines.

The scale factor in this example is 0.5, which means to say that half as many output pixels (shown as a line 1350 of numbered pixels) are generated compared to the number of input pixels.

An output pixel number 3 corresponds in position to an input pixel number 6. The seven tap filter acts on the input pixels numbers 3 to 9 to generate a value for the output pixel number 3.

Referring to FIG. 41, as the input filter moves to the next input pixel position, it now acts on the input pixels 4 to 10, centred around an input pixel number 7. But because the scale factor is 0.5, there is no output pixel at a position corresponding to the position of the input pixel number 7. Therefore, the operation shown in FIG. 41 is aborted or prevented from taking place, or it is allowed to take place but its result is discarded. In either case, the arrangement is potentially wasteful of resources.

The process continues: in this example of a scaling factor of 0.5, one output pixel is generated and then the next filtering operation is not applicable to an output pixel, then another output pixel is generated and so on.

Figure 42:
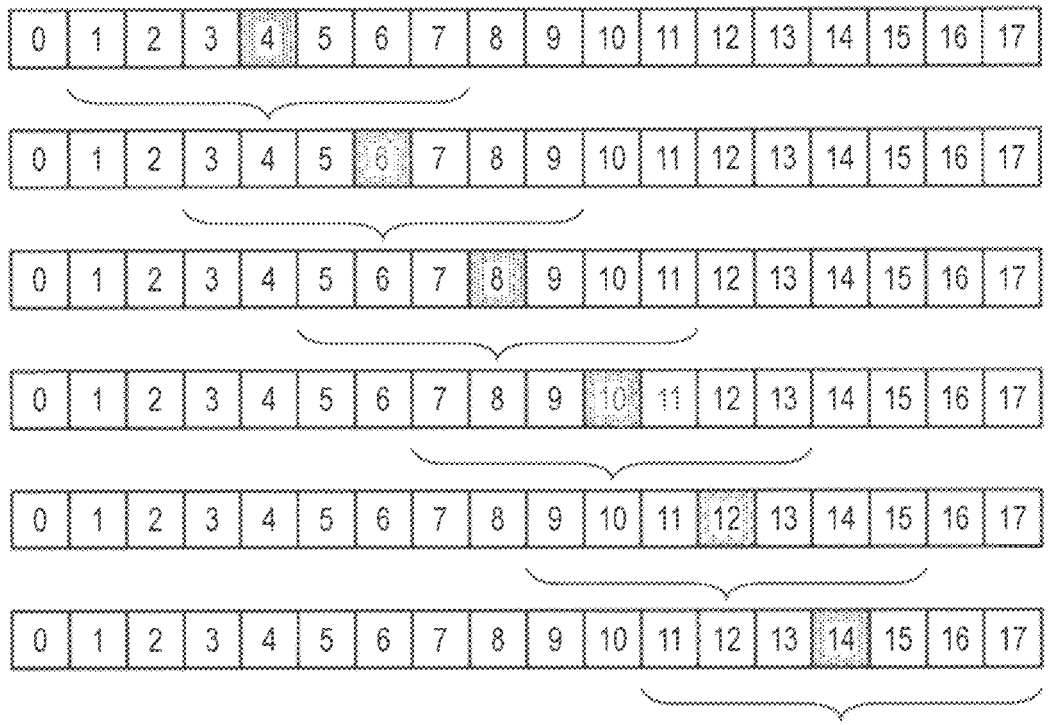
FIGS. 42 and 43 schematically illustrate successive filtering operations.

FIG. 42 provides a schematic illustration of the effective filtering operations (those which lead to the generation of an output pixel) over the generation of six successive output pixels (in fact, the output pixels 2, 3, 4, 5, 6, 7 using the notation of FIGS. 40 and 41). The input pixels are the same from row to row in FIG. 42; that is to say, the rows correspond to successive operations carried out on the same image line of pixels, rather than to different lines of pixels. In each row as drawn in FIG. 42, the centre pixel of the filtering operation, which in this example corresponds in position to the position of the output pixel generated by the filtering operation, is shown as a shaded box, and the groups of seven pixels on which the seven tap filter operates are indicated by curved brackets under the respective lines.

Figure 43:
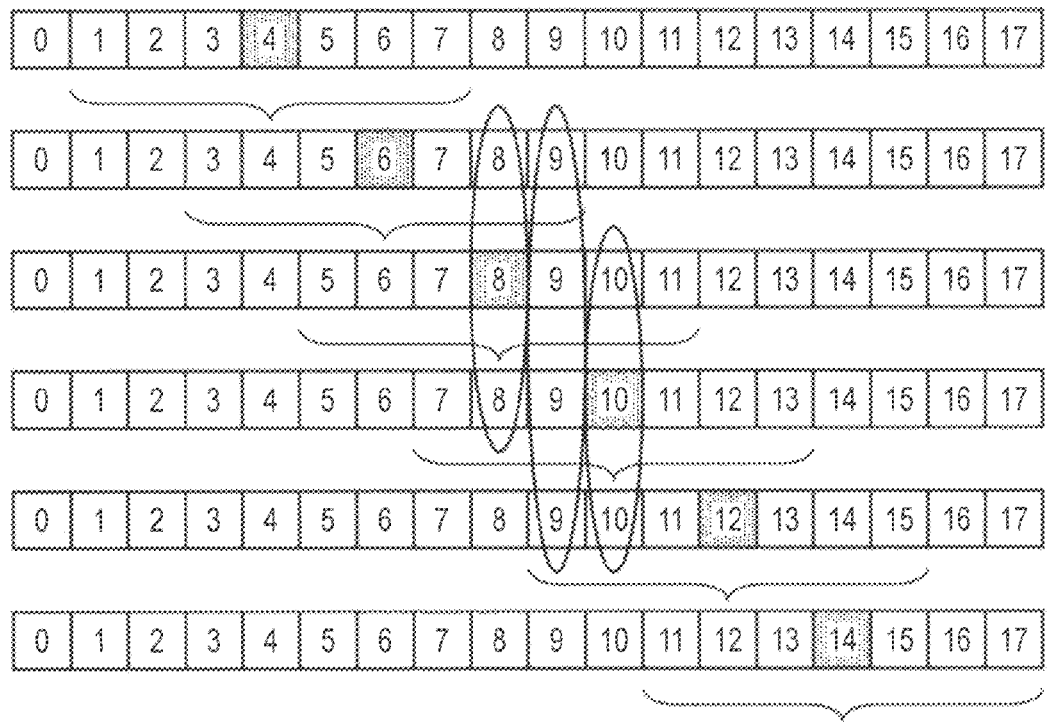

The same information is provided in FIG. 43, but here the fact that input pixels take part in multiple filtering operations is illustrated. For example, the input pixel number 8 takes part in the filtering of the second, third and fourth filtering operations in the generation of the output pixels 3, 4 and 5 using the notation of FIGS. 40 and 41. The input pixel number 9 takes part in four filtering operations, and the input pixel number 10 takes part in three such operations.

Figure 44:
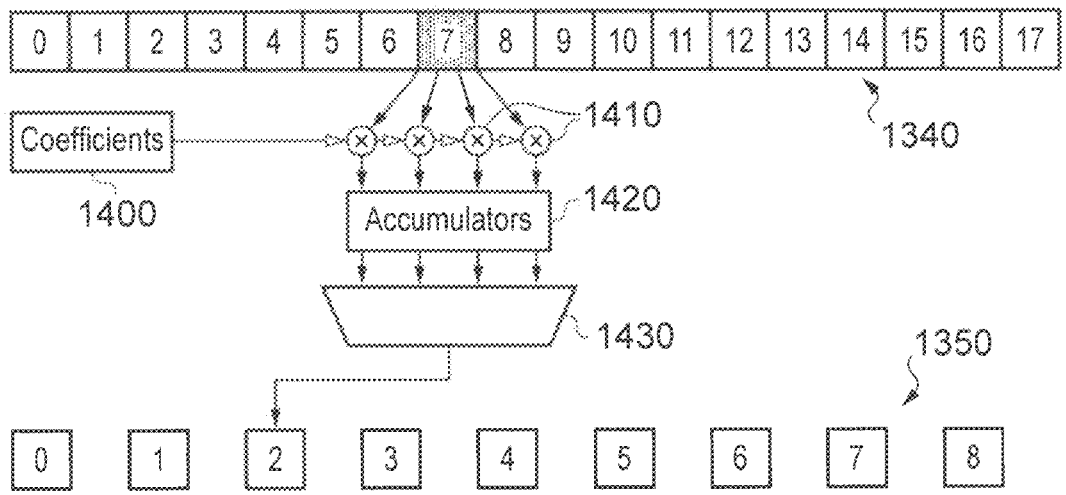
FIG. 44 schematically illustrates an embodiment of a filtering arrangement.

Embodiments of the invention therefore use a different filtering arrangement which recognises that each input pixel takes part in either 3 or 4 coefficient multiplication operations during the generation of a line of output pixels for a seven tap filter and a scaling factor of 0.5. The number of multiplications required for each source is a function of the number of taps required at 1:1 scaling. For a 7 tap filter, each input pixel actually takes part in 7 multiplications at 1:1, but at a scaling factor of 0.5, each input pixel is required only 3 or 4 times. At even smaller scaling ratios, as observed, some pixels may not even be required. If the scaling factor was (say) 0.01, then each input pixel takes part in 0 or 1 multiplications. FIG. 44 provides a schematic illustration of such a filtering arrangement, which acts on the line of input pixels 1340 to generate the line of output pixels 1350. The accumulator technique can technically be used for any finite impulse response (FIR) filtering method (whether applicable to pixel data or other data) as it will yield the same results as standard FIR filtering (IIR filters cannot be used in this manner), at 1:1 or shrinking (whereby the output image comprises a smaller number of pixels than the input image and interpolation is used to generate pixels of the output image). However, a particularly significant benefit for this process is realised when shrinking with a FIR filter (Sinc, Gaussian, Laplacian etc), as the number of taps used in the filter stage can grow as a function of the scaling factor, with no additional multiplication resources needed.

A coefficient generator 1400 generates respective filter coefficients which are supplied to a set of multipliers comprising, in this example, four multipliers 1410.

The output of each multiplier is supplied to an accumulator arrangement 1420, and the outputs of the accumulator arrangement are passed to a multiplexer 1430.

The basic principle of operation of the filtering arrangement of FIG. 44 is that instead of using seven taps, acting on seven input pixels, to carry out the seven multiplications needed to generate an output pixel, the arrangement carries out all of the multiplications needed for a particular input pixel, then moves to the next input pixel, and so on. In other words, each multiplication of an input data (pixel) value by a filter tap coefficient provides a contribution to an output filter value so that each output (pixel) filter value represents a sum of such contributions from a respective group of input data values, the number of input filter values being greater than the number of output filter values derived using those input filter values. The accumulator arrangement acts to accumulate the seven contributions needed to generate each output pixel, although those seven contributions are generated over seven successive operations rather than in a single operation. Therefore the accumulator arrangement is operable to accumulate, across successive operations of the set of multipliers, respective sums of contributions from input data values in a group so as to generate the output filter values.

To illustrate this operation, consider the following set of filter coefficients:

| tap | coefficient |
|---|---|
| −3 | $C_{-3}$ |
| −2 | $C_{-2}$ |
| −1 | $C_{-1}$ |
| 0 | $C_0$ |
| 1 | $C_1$ |
| 2 | $C_2$ |
| 3 | $C_3$ |

Here, the tap number refers to the offset (in input pixels) from the current centre input pixel. So, in the previously proposed filtering arrangement shown in FIGS. 40 and 41, in a first operation the input pixels 3 to 9 are multiplied by coefficients $C_{-3}$ to $C_3$ respectively, and the seven products are added together by the summation unit 1320. Accordingly, the multipliers 1410 act as a set of multipliers operable in respect of an input data value and arranged to generate, from each input data value in turn, a set of those contributions based on that input data value which are required in respect of the interpolation of any output filter values which are dependent upon that input data value.

In contrast, in the filtering arrangement of FIG. 44, all of the multiplications required in respect of a single input pixel take place at the same time, and then the multipliers move on to the next input pixel so that all of the multiplication operations required in respect of the next input pixel take place, and so on. The appropriate coefficients are provided by the coefficient generator. The coefficient generator therefore comprises logic to derive the respective coefficients for multiplications to be applied to an input data value in response to the positions in the output image of pixels dependent upon contributions from that input data value, relative to the position in the input image of that input data value.

So, for example, as shown in FIG. 44 the multiplications required in respect of the input pixel number 7 are taking place. These are:

| | |
|---|---|
| Input pixel 7 × $C_3$ | to contribute to the generation of output pixel 2 |
| Input pixel 7 × $C_1$ | to contribute to the generation of output pixel 3 |
| Input pixel 7 × $C_{-1}$ | to contribute to the generation of output pixel 4 |
| Input pixel 7 × $C_{-3}$ | to contribute to the generation of output pixel 5 |

Of these output pixels, at the time that the multipliers act on the input pixel 7, the processing for the output pixel 2 is complete, and so the accumulated value of the output pixel 2 is output by the multiplexer. At the same time, the multiplexer acts to reset the accumulated value (which has just been output as the output pixel 2) to zero, so that part of the accumulator arrangement can be used to start storing the next-required output pixel.

Therefore, in a steady state (away from the edge of a line) at any time the accumulator arrangement is storing accumulating contributions towards six output pixels and is outputting, via the multiplexer, the fully accumulated value of a seventh output pixel. More generally, as many accumulators as original filter taps are needed. This arrangement has the advantage that the hardware or other processing resources are being used more efficiently than in the previously proposed arrangement. In particular, rather than carrying out seven multiplications at one time and none at another time, the filtering arrangement carries out three or four multiplications at any time.

There is another potential advantage which relates to image quality in situations where the scaling factor is less than one.

This is that the arrangement means that the effective number of filter taps increases as the scale factor reduces.

In particular, the process is mathematically equivalent to a fixed filter algorithm, except that the number of taps varies. The effective number of taps is equal to the integer value of the number of multipliers divided by the scaling factor, possibly less one if this results in an even number (as the effective number of taps must be odd).

This is useful, as it allows an image shrink by any amount without aliasing in the filtering operations. For example a fixed filter of 21 taps (according to FIG. 40) would start aliasing when image shrinkage of 1920 down to 384 pixels is applied. However, a variable filter that has a 'base' number of taps of 7 will actually be equivalent to a fixed filter of 35 taps at this scaling factor. As an extreme example, a shrinkage from 1920 down to 1 pixel could in principle be applied without aliasing, and would produce a filter response using the arrangement of FIG. 44 equivalent to a fixed filter of 13440 taps.

The coefficients needed in a real situation can be generated when needed or stored in a look-up table.

Example Applications

Two example applications of the image scaling techniques will now be described.

Figure 45:
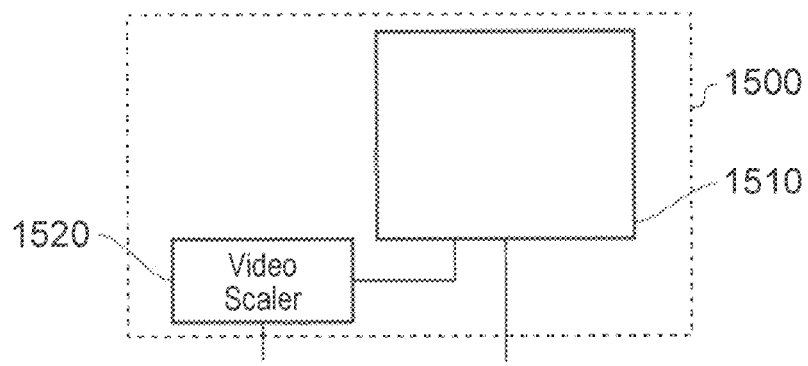
FIG. 45 schematically illustrates a television display apparatus.

FIG. 45 schematically illustrates a television apparatus 1500 comprising a flat panel display screen 1510 and a video scaler 1520 which comprises apparatus as shown in FIG. 3, acting on a succession of video images. The television apparatus can display video signals of different resolutions, either by routing them directly to the display (in the case that the video signal has a native resolution of the display 1510) or by routing them via the video scaler 1520 (in other cases).

Figure 46:
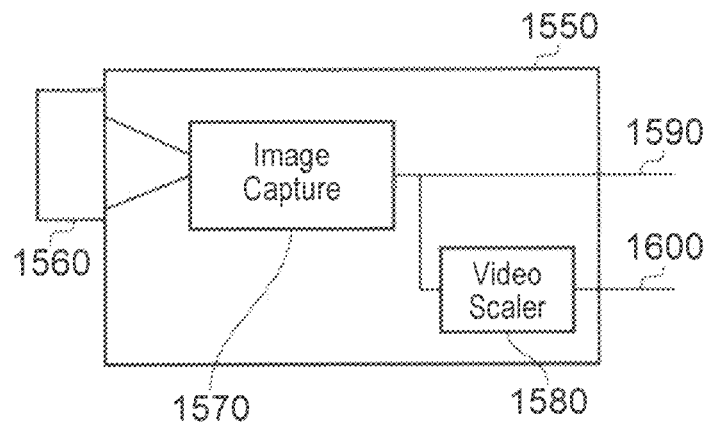
FIG. 46 schematically illustrates a video camera.

FIG. 46 schematically illustrates a video camera 1550 comprising a lens arrangement 1560, an image capture device 1570 which generates video signals at a particular image resolution, and a video scaler 1580 arranged to scale images output by the image capture device to another resolution. This arrangement allows the video camera to output video images at its native resolution on an output 1590 and/or video images at a different resolution on an output 1600.

It will be appreciated that any of the techniques described here may be implemented by hardware, software or a combination of them. A non-transitory machine-readable storage medium such as an optical or a magnetic disk on which such software is stored is considered to represent an embodiment of the present invention.

It will be understood that the present techniques may be applied, where appropriate, to a Sinc filter, a Bicubic filter, a Bicubic Spline filter, a Gaussian filter, a Bilinear filter, a Biquadratic filter, a Biquintic filter, a generic polynomial-based filter, or FIR filters and splines.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

Appendix

Bicubic Interpolation

Bicubic interpolation involves fitting a third order polynomial to a set of data, to interpolate the required pixel. The four closest pixels to the interpolated pixel are used to form the polynomial.

The general form of the curve is given by:

$$y = Ax^3 + Bx^2 + Cx + D$$

Figure 47:
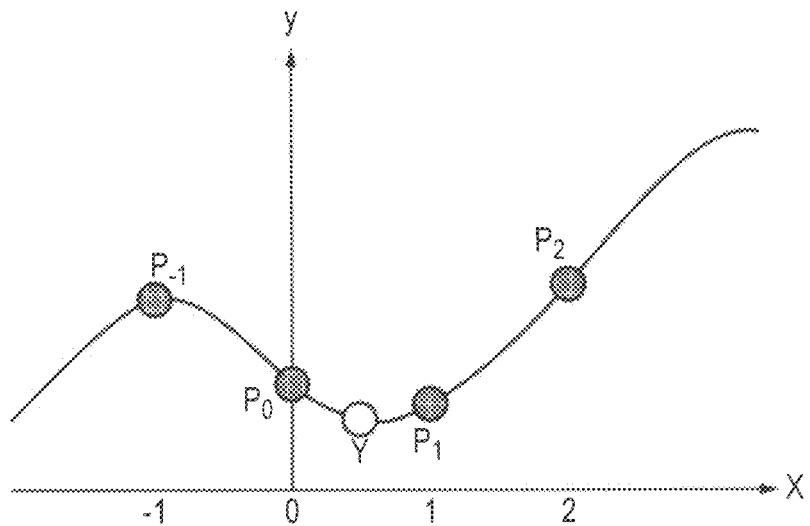
FIG. 47 schematically illustrates Bicubic interpolation.

The conditions for the polynomial are that each of four source pixels must intersect the curve. A schematic example of such a curve is shown in FIG. 47.

Therefore, evaluating the equation at $x=-1, 0, 1$ and $2$, yields the following matrix of equations:

$$\begin{bmatrix} -1 & 1 & -1 & 1 \\ 0 & 0 & 0 & 1 \\ 1 & 1 & 1 & 1 \\ 8 & 4 & 2 & 1 \end{bmatrix} \begin{bmatrix} A \\ B \\ C \\ D \end{bmatrix} = \begin{bmatrix} P_{-1} \\ P_0 \\ P_1 \\ P_2 \end{bmatrix}$$

Solving the equation above yields the values of A, B, C and D.

$$\begin{bmatrix} A \\ B \\ C \\ D \end{bmatrix} = \frac{1}{6} \begin{bmatrix} -1 & 3 & -3 & 1 \\ 3 & -6 & 3 & 0 \\ -2 & -3 & 6 & -1 \\ 0 & 6 & 0 & 0 \end{bmatrix} \begin{bmatrix} P_{-1} \\ P_0 \\ P_1 \\ P_2 \end{bmatrix}$$

Using the values of A, B, C and D, the general equation can be evaluated to find the value of the interpolated pixel for any given value of x in the range of 0 to 1. It is imperative that the value of x does not exceed the range of 0 and 1; this is ensure that the curve is balanced either side by the same number of pixels.

Bicubic interpolation can be used to scale an image horizontally, vertically or both. In the case of the latter, sixteen of the closest pixels are used to interpolate the output pixel.

Bicubic Spline Interpolation

Bicubic Spline interpolation also involves fitting a third order polynomial to the data points. However, rather than forcing the bicubic equation to intersect all the source pixels, other restrictions are imposed.

Figure 48:
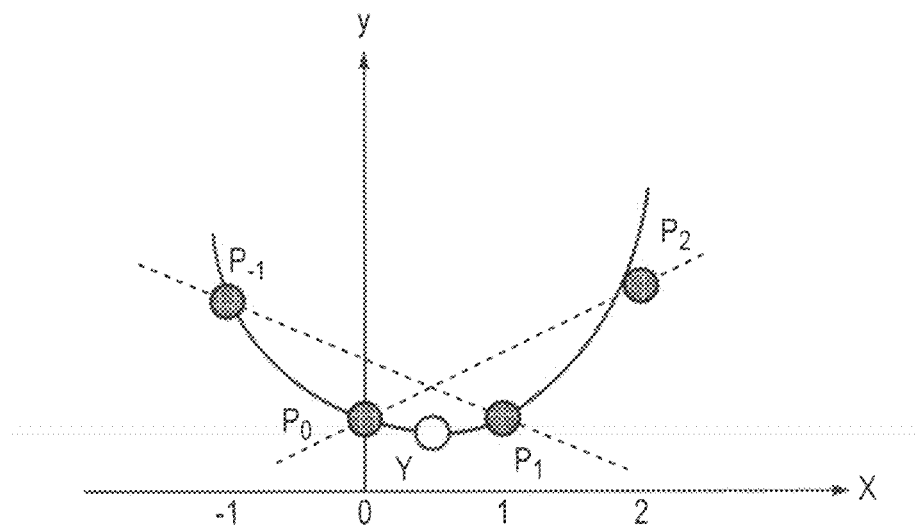
FIG. 48 schematically illustrates Bicubic spline interpolation.

The first restriction is that the curve must intersect pixel $P_0$ and $P_1$. The second is that the gradient at pixels $P_0$ and $P_1$ must be continuous, so they must match the gradient formed from the pixels either side of them. A schematic example of a curve of this nature is illustrated in FIG. 48.

The general form of the curve is given by:

$$y(x) = Ax^3 + Bx^2 + Cx + D$$

Using the first condition that the curve must pass through pixels $P_0$ and $P_1$, yields the following equations:

$$y(0) = P_0 = D$$

$$y(1) = P_1 = A + B + C + D$$

The second conditions states that the gradients at pixels $P_0$ and $P_1$ must be continuous. The gradient at pixel $P_0$ must be the same as the gradient formed between pixels $P_{-1}$ and $P_1$, also, the gradient at pixel $P_1$ must be the same as the gradient formed between pixels $P_2$ and $P_0$. These conditions yield the following equations:

$$y'(x) = 3Ax^2 + 2Bx + C$$

$$y'(0) = C = \frac{P_1 - P_1}{2}$$

$$y'(1) = 3A + 2B + C = \frac{P_2 - P_0}{2}$$

Solving the equations above, the values of A, B, C and D are calculated as follows:

$$\begin{bmatrix} A \\ B \\ C \\ D \end{bmatrix} = \frac{1}{2} \begin{bmatrix} -1 & 3 & -3 & 1 \\ 2 & -5 & 4 & -1 \\ -1 & 0 & 1 & 0 \\ 0 & 2 & 0 & 0 \end{bmatrix} \begin{bmatrix} P_{-1} \\ P_0 \\ P_1 \\ P_2 \end{bmatrix}$$

The values of A,B,C and D can now be substituted back to find the interpolated value Y for any given value of x in the range of 0 to 1.

Linear and Nearest Neighbour Interpolation

The above formulation can be adapted to produce linearly interpolation or nearest neighbour interpolation by altering the coefficients A, B, C and D. Linear interpolation involves fitting a straight line between two pixels, i.e.

$y = P_0(1-x) + xP_1$ $y = (P_1 - P_0)x + P_0$

Using the equation:

$y(x) = Ax^3 + Bx^2 + Cx + D$ to achieve linear interpolation, $A = B = 0$ $C = (P_1 - P_0), D = P_0$ Similarly, to achieve nearest neighbour interpolation:

$A = B = C = 0$ $D = P_0$

We claim:

1. A method of pixel interpolation in which a two-dimensional digital filter is arranged so as to interpolate an output pixel from a two-dimensional array of input pixels, the method comprising:
    detecting the direction of an image feature at a pixel position to be interpolated;
    applying a shear transformation to the digital filter and/or to the array of input pixels so as to map the operation of the filter to the detected image feature direction in respect of at least a first one of two axes of the two dimensional filter; and
    applying the digital filter to obtain the output pixels.

2. A method according to claim 1, in which the step of applying the shear transformation is arranged to leave the operation of the filter unchanged in respect of the other of the two axes.

3. A method according to claim 2, in which the applying step comprises:
    selecting one of the two axes for the mapping of the filter operation, the selection being dependent upon the detected image feature direction.

4. A method according to claim 3, in which the selecting step comprises:
    detecting which of the two axes is angularly closest to the detected image feature direction; and
    selecting the other of the two axes for the mapping of the filter operation.

5. A method according to claim 1, in which the two axes are orthogonal.

6. A method according to claim 5, in which the two axes comprise an axis in a horizontal image direction and an axis in a vertical image direction respectively.

7. A method according to claim 1, in which the two-dimensional filter is selected from the group consisting of:
    a two-dimensional Sinc filter;
    a two-dimensional Bicubic filter;
    a two-dimensional Bicubic Spline filter; and
    a two-dimensional polynomial-based filter.

8. A method according to claim 1, comprising:
    detecting a degree of confidence in the detected image feature direction; and
    selectively generating the output pixels by applying the shear transformation and/or not applying the shear transformation, in dependence on the detected degree of confidence.

9. A method according to claim 8, comprising:
    generating a first version of an output pixel by applying the shear transformation;
    generating a second version of that output pixel without applying the shear transformation; and
    mixing the first and second versions according to a ratio dependent upon the detected degree of confidence, to generate the output pixel.

10. A method according to claim 9, in which the mixing step is operable so that a higher degree of confidence in the detected image feature direction results in a higher proportion of the output pixel being derived from the first version.

11. A method according to claim 1, comprising:
    filtering groups of input pixels in respect of the first axis, the groups being spaced along the detected image feature direction, so as to generate respective intermediate pixel values; and
    filtering the intermediate pixel values in respect of the other axis, so as to generate an output pixel.

12. A method according to claim 1, in which the applying step comprises:
    applying the shear transformation to filter coefficients of the two-dimensional digital filter so as to map the coefficients to different respective positions in the two-dimensional domain, in accordance with the detected image feature direction.

13. A method according to claim 1, comprising a filter for filtering the detected directions so as to smooth the variation of detected direction between adjacent input or output pixel positions.

14. A non-transitory computer readable storage medium on which is stored computer software that when executed by a computer causes the computer to implement a method of pixel interpolation in which a two-dimensional digital filter is arranged so as to interpolate an output pixel from a two-dimensional array of input pixels, the method comprising:
    detecting the direction of an image feature at a pixel position to be interpolated;
    applying a shear transformation to the digital filter and/or to the array of input pixels so as to map the operation of the filter to the detected image feature direction in respect of at least a first one of two axes of the two dimensional filter; and
    applying the digital filter to obtain the output pixels.

15. A two-dimensional digital filter arranged so as to interpolate an output pixel from a two-dimensional array of input pixels, the filter comprising:
    a detector to detect the direction of an image feature at a pixel position to be interpolated; and
    a filter operation modifier operable to apply a shear transformation to the digital filter and/or to the array of input pixels so as to map the operation of the filter to the detected image feature direction in at least one of two axes of the two dimensional filter.

16. Video processing apparatus comprising a filter according to claim 15, the filter acting to interpolate pixels of successive output images of an output video signal.

17. A video camera comprising video processing apparatus according to claim 16.

18. Video display apparatus comprising video processing apparatus according to claim 16.

* * * * *